United States Patent
Liu et al.

(10) Patent No.: US 11,792,813 B2
(45) Date of Patent: Oct. 17, 2023

(54) RETRANSMISSION OF SEMI-PERSISTENT SCHEDULED GROUP COMMON DOWNLINK SIGNALING

(71) Applicant: QUALCOMM Incorporated, San Diego, CA (US)

(72) Inventors: Le Liu, Fremont, CA (US); Kazuki Takeda, Tokyo (JP); Alberto Rico Alvarino, San Diego, CA (US); Mostafa Khoshnevisan, San Diego, CA (US); Peter Gaal, San Diego, CA (US); Wanshi Chen, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 17/220,764

(22) Filed: Apr. 1, 2021

(65) Prior Publication Data
US 2022/0322309 A1    Oct. 6, 2022

(51) Int. Cl.
*H04W 72/23* (2023.01)
*H04W 72/56* (2023.01)

(52) U.S. Cl.
CPC .......... *H04W 72/23* (2023.01); *H04W 72/56* (2023.01)

(58) Field of Classification Search
CPC ............... H04L 1/1887; H04L 1/1896; H04L 2001/0093; H04W 72/23; H04W 72/56
See application file for complete search history.

(56) References Cited

U.S. PATENT DOCUMENTS 8,165,052 B2 *  4/2012  Qu ................. H04L 5/023
                                              370/312
8,224,343 B2 *  7/2012  Wang ............. H04L 1/1867
                                              455/452.2
(Continued)

FOREIGN PATENT DOCUMENTS

CN      1738233 A  *  2/2006  ........... H04L 1/0065
CN      1941687 A  *  4/2007  ............ H04L 5/023
(Continued)

OTHER PUBLICATIONS

International Search Report and Written Opinion—PCT/US2022/018354—ISA/EPO—dated Sep. 6, 2022.
(Continued)

*Primary Examiner* — Eric Nowlin
(74) *Attorney, Agent, or Firm* — Holland & Hart LLP

(57) ABSTRACT

Methods, systems, and devices for wireless communications are described. A user equipment (UE) may receive one or more retransmissions of an initial group-common transmission. The UE may receive, in accordance with a first SPS configuration, a group-common transmission of a group-common downlink shared channel, the group-common transmission being associated with a first RNTI. The UE may transmit feedback information for the group-common transmission. The UE may then receive a downlink control information (DCI) message scheduling either a group-common retransmission of the group-common downlink shared channel or a unicast retransmission of the group-common downlink shared channel. The DCI may indicate that either the group-common retransmission is associated with the first RNTI or that the unicast retransmission is associated with a second RNTI that may be different from the first RNTI.

48 Claims, 15 Drawing Sheets

(56) References Cited

U.S. PATENT DOCUMENTS

| | | | |
|---|---|---|---|
| 10,833,829 B2 * | 11/2020 | Lee | H04L 1/1896 |
| 11,395,260 B2 * | 7/2022 | Liu | H04L 1/1896 |
| 11,476,982 B2 * | 10/2022 | Sengupta | H04L 27/2607 |
| 11,477,687 B2 * | 10/2022 | Kadiri | H04W 4/06 |
| 11,497,042 B2 * | 11/2022 | Damnjanovic | H04L 5/0044 |
| 11,540,310 B2 * | 12/2022 | Fakoorian | H04L 1/1896 |
| 11,671,980 B2 * | 6/2023 | Taherzadeh Boroujeni | H04L 5/005 370/329 |
| 2006/0098567 A1 * | 5/2006 | Willenegger | H04W 72/30 370/329 |
| 2008/0175264 A1 * | 7/2008 | Qu | H04L 5/023 370/436 |
| 2010/0177676 A1 * | 7/2010 | Wang | H04L 1/1861 370/312 |
| 2011/0194511 A1 * | 8/2011 | Chen | H04W 72/23 370/329 |
| 2012/0066396 A1 * | 3/2012 | Kang | H04L 12/1868 709/226 |
| 2014/0226552 A1 * | 8/2014 | Niu | H04W 4/06 370/312 |
| 2014/0355493 A1 * | 12/2014 | Niu | H04L 12/189 370/312 |
| 2019/0132104 A1 * | 5/2019 | Lee | H04L 1/1664 |
| 2019/0166621 A1 * | 5/2019 | Yerramalli | H04W 16/14 |
| 2020/0022144 A1 * | 1/2020 | Papasakellariou | H04W 72/0453 |
| 2020/0106567 A1 * | 4/2020 | Bharadwaj | H04L 5/1469 |
| 2020/0374048 A1 * | 11/2020 | Lei | H04L 1/1896 |
| 2021/0037500 A1 * | 2/2021 | Liu | H04L 1/189 |
| 2021/0051701 A1 * | 2/2021 | Fakoorian | H04L 1/1896 |
| 2021/0068003 A1 * | 3/2021 | Kadiri | H04W 76/40 |
| 2021/0194714 A1 * | 6/2021 | Kadiri | H04L 12/1868 |
| 2021/0195573 A1 * | 6/2021 | Wang | H04W 4/40 |
| 2021/0352701 A1 * | 11/2021 | Taherzadeh Boroujeni | H04W 72/23 |
| 2021/0376966 A1 * | 12/2021 | Sengupta | H04L 27/2607 |
| 2022/0173835 A1 * | 6/2022 | Mansuy | H04W 68/06 |
| 2022/0232610 A1 * | 7/2022 | Lee | H04L 5/0053 |
| 2022/0329363 A1 * | 10/2022 | Lee | H04L 1/1812 |
| 2022/0360950 A1 * | 11/2022 | Li | H04W 4/06 |
| 2023/0019024 A1 * | 1/2023 | Stare | H04W 72/23 |
| 2023/0076822 A1 * | 3/2023 | Hao | H04L 1/22 |

FOREIGN PATENT DOCUMENTS

| | | | | |
|---|---|---|---|---|
| CN | 101156342 A | * | 4/2008 | H04L 5/023 |
| CN | 101156342 B | * | 3/2012 | H04L 5/023 |
| CN | 102594510 A | * | 7/2012 | H04L 5/023 |
| CN | 102594510 B | * | 5/2016 | H04L 5/023 |
| CN | 112740593 A | * | 4/2021 | H04L 1/1812 |
| CN | 114208366 A | * | 3/2022 | H04L 1/1812 |
| CN | 115606124 A | * | 1/2023 | H04L 1/08 |
| EP | 1940060 A1 | * | 7/2008 | H04L 5/023 |
| EP | 1940060 B1 | * | 5/2012 | H04L 5/023 |
| EP | 3282725 A1 | | 2/2018 | |
| EP | 4082142 A1 | * | 11/2022 | H04L 1/1825 |
| FR | 3095317 A1 | * | 10/2020 | H04H 20/16 |
| JP | 2006060822 A | * | 3/2006 | H04L 1/0065 |
| JP | 2009526496 A | * | 7/2009 | |
| JP | 2010536287 A | * | 11/2010 | |
| JP | 5172957 B2 | * | 3/2013 | H04L 1/1822 |
| KR | 20060053180 A | * | 5/2006 | |
| TW | 202025805 A | * | 7/2020 | H04L 1/1812 |
| WO | WO-2007036116 A1 | * | 4/2007 | H04L 5/023 |
| WO | WO-2013131264 A1 | | 9/2013 | |
| WO | WO-2017192009 A1 | * | 11/2017 | H04L 1/1607 |
| WO | WO-2020068671 A1 | * | 4/2020 | H04L 1/1812 |
| WO | WO-2020212486 A1 | * | 10/2020 | H04H 20/16 |
| WO | WO-2021030144 A1 | * | 2/2021 | H04L 1/1812 |
| WO | WO-2021109460 A1 | * | 6/2021 | H04L 1/08 |
| WO | WO-2021133238 A1 | * | 7/2021 | H04L 1/1825 |
| WO | WO-2021142702 A1 | * | 7/2021 | |
| WO | WO-2021143869 A1 | * | 7/2021 | |
| WO | WO-2021225779 A1 | * | 11/2021 | H04L 5/005 |
| WO | WO-2021242662 A1 | * | 12/2021 | H04L 1/1664 |
| WO | WO-2022061912 A1 | * | 3/2022 | |
| WO | WO-2022071846 A1 | * | 4/2022 | |
| WO | WO-2023014138 A1 | * | 2/2023 | |

OTHER PUBLICATIONS

Partial International Search Report—PCT/US2022/018354—ISA/EPO—dated Jul. 14, 2022.

VIVO: "Other Issues for Rel-17 MBS", 3GPP Draft, 3GPP TSG RAN WG1 #102-e, R1-2006658, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), XP051918172, 3 Pages, Retrieved from the Internet: URL: https://ftp.3gpp.org/tsg_ran/WG1_RL1/TSGR1_102-e/Docs/R1-2006658.zip R1-2006658 Other Issues for Rel-17 MBS.docx [Retrieved on Aug. 8, 2020] Sections 2.1-2.2.

* cited by examiner

RETRANSMISSION OF SEMI-PERSISTENT SCHEDULED GROUP COMMON DOWNLINK SIGNALING

FIELD OF TECHNOLOGY

The following relates to wireless communications, including retransmission of semi-persistent scheduled group common downlink signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, communications between wireless devices (e.g., between a base station and one or more UEs) can be split into two categories: point-to-point (PTP) communications (e.g., unicast communications) and point-to-multipoint (PTM) communications (e.g., multicast communications, broadcast communications, etc.). Techniques are desired for enabling PTM communications.

SUMMARY

The described techniques relate to improved methods, systems, devices, and apparatuses that support retransmission of semi-persistent scheduled group common downlink signaling. Generally, the described techniques provide for a user equipment (UE) receiving one or more retransmission of an initial group-common transmission, where the initial group-common transmission may correspond to a group configured scheduling radio network temporary identifier (G-CS-RNTI). The UE may receive, in accordance with a first semi-persistent scheduling (SPS) configuration, a group-common transmission of a group-common downlink shared channel, the group-common transmission being associated with a first RNTI (e.g., the G-CS-RNTI). The UE may transmit feedback information for the group-common transmission. The feedback information may include hybrid automatic repeat request (HARQ) feedback, including an acknowledgment (ACK) or a negative ACK (NACK). The UE may then receive a downlink control information (DCI) message scheduling either a group-common retransmission of the group-common downlink shared channel or a unicast retransmission of the group-common downlink shared channel. The DCI may indicate that either the group-common retransmission is associated with the first RNTI or that the unicast retransmission is associated with a second RNTI that may be different from the first RNTI.

A method for wireless communications at a user equipment (UE) is described. The method may include receiving, in accordance with a first SPS configuration, a group-common transmission of a group-common downlink shared channel, the group-common transmission being associated with a first RNTI, transmitting feedback information for the group-common transmission, and receiving a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

An apparatus for wireless communications at a UE is described. The apparatus may include a processor, memory coupled with the processor, and instructions stored in the memory. The instructions may be executable by the processor to cause the apparatus to receive, in accordance with a first SPS configuration, a group-common transmission of a group-common downlink shared channel, the group-common transmission being associated with a first RNTI, transmit feedback information for the group-common transmission, and receive a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

Another apparatus for wireless communications at a UE is described. The apparatus may include means for receiving, in accordance with a first SPS configuration, a group-common transmission of a group-common downlink shared channel, the group-common transmission being associated with a first RNTI, means for transmitting feedback information for the group-common transmission, and means for receiving a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

A non-transitory computer-readable medium storing code for wireless communications at a UE is described. The code may include instructions executable by a processor to receive, in accordance with a first SPS configuration, a group-common transmission of a group-common downlink shared channel, the group-common transmission being associated with a first RNTI, transmit feedback information for the group-common transmission, and receive a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

Some examples of the method, apparatuses, and non-transitory computer-readable medium described herein may further include operations, features, means, or instructions for receiving a SPS retransmission configuration indicating whether a group-common retransmission scheme or a unicast retransmission scheme may be to be used, where the DCI message schedules either the group-common retransmission or the unicast retransmission in accordance with the SPS retransmission configuration.

Some examples of the method, apparatuses, and non-transitory computer-readable medium described herein may further include operations, features, means, or instructions for receiving a different unicast transmission in accordance with a second SPS configuration different from the first SPS configuration, where the unicast transmission and the group-common transmission may be scheduled in a same TTI and receiving an additional DCI message scheduling a retransmission of the different unicast transmission, where the retransmission of the different unicast transmission and the unicast retransmission of the group-common downlink shared channel correspond to a same feedback process identifier.

Some examples of the method, apparatuses, and non-transitory computer-readable medium described herein may further include operations, features, means, or instructions for determining a first priority level of the group-common transmission and a second priority level of the different unicast transmission based on radio resource control signaling, DCI or a combination thereof and receiving one of the unicast retransmission of the group-common downlink shared channel or the retransmission of the different unicast transmission based on relative values of the first priority level and the second priority level.

Some examples of the method, apparatuses, and non-transitory computer-readable medium described herein may further include operations, features, means, or instructions for determining a first SPS configuration identifier corresponding to the group-common transmission and a second SPS configuration identifier corresponding to the different unicast transmission and receiving one of the unicast retransmission of the group-common downlink shared channel or the retransmission of the different unicast transmission based on relative values of the first SPS configuration identifier and the second SPS configuration identifier.

Some examples of the method, apparatuses, and non-transitory computer-readable medium described herein may further include operations, features, means, or instructions for receiving the unicast retransmission of the group-common downlink shared channel and receiving the retransmission of the different unicast transmission.

In some examples of the method, apparatuses, and non-transitory computer-readable medium described herein, the unicast retransmission of the group-common downlink shared channel and the retransmission of the different unicast transmission each may have different feedback process identifiers.

In some examples of the method, apparatuses, and non-transitory computer-readable medium described herein, the unicast retransmission of the group-common downlink shared channel and the retransmission of the different unicast transmission may be each associated with the same feedback process identifier and may be each also associated with a same RNTIs and the method, apparatuses, and non-transitory computer-readable medium may include further operations, features, means, or instructions for receiving an indicator in the additional DCI message scheduling the unicast retransmission of the group-common downlink shared channel, the indicator differentiating between the unicast retransmission of the group-common downlink shared channel and the retransmission of the different unicast transmission.

In some examples of the method, apparatuses, and non-transitory computer-readable medium described herein, the unicast retransmission of the group-common downlink shared channel and the retransmission of the different unicast transmission may be each associated with the same feedback process identifier but may be each associated with different RNTIs.

Some examples of the method, apparatuses, and non-transitory computer-readable medium described herein may further include operations, features, means, or instructions for receiving the retransmission of the different unicast transmission and the unicast retransmission in different TTIs, where the unicast retransmission of the group-common downlink shared channel and the retransmission of the different unicast transmission share a same feedback process identifier.

Some examples of the method, apparatuses, and non-transitory computer-readable medium described herein may further include operations, features, means, or instructions for transmitting an indication of a capability of the UE to receive the different unicast transmission and the group-common transmission in the same TTI and corresponding to the same feedback process identifier.

In some examples of the method, apparatuses, and non-transitory computer-readable medium described herein, the first RNTI includes a group configured scheduling RNTI.

In some examples of the method, apparatuses, and non-transitory computer-readable medium described herein, the second RNTI includes a configured scheduling RNTI.

A method for wireless communications at a base station is described. The method may include transmitting, in accordance with a first SPS configuration, a group-common transmission of a group-common downlink shared channel, the group-common transmission being associated with a first RNTI, receiving feedback information for the group-common transmission, determining a RNTI to use for a retransmission of the group-common transmission, and transmitting a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

An apparatus for wireless communications at a base station is described. The apparatus may include a processor, memory coupled with the processor, and instructions stored in the memory. The instructions may be executable by the processor to cause the apparatus to transmit, in accordance with a first SPS configuration, a group-common transmission of a group-common downlink shared channel, the group-common transmission being associated with a first RNTI, receive feedback information for the group-common transmission, determine a RNTI to use for a retransmission of the group-common transmission, and transmit a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

Another apparatus for wireless communications at a base station is described. The apparatus may include means for transmitting, in accordance with a first SPS configuration, a group-common transmission of a group-common downlink shared channel, the group-common transmission being associated with a first RNTI, means for receiving feedback information for the group-common transmission, means for determining a RNTI to use for a retransmission of the group-common transmission, and means for transmitting a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

A non-transitory computer-readable medium storing code for wireless communications at a base station is described. The code may include instructions executable by a processor to transmit, in accordance with a first SPS configuration, a group-common transmission of a group-common downlink shared channel, the group-common transmission being associated with a first RNTI, receive feedback information for the group-common transmission, determine a RNTI to use for a retransmission of the group-common transmission, and transmit a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

Some examples of the method, apparatuses, and non-transitory computer-readable medium described herein may further include operations, features, means, or instructions for transmitting a SPS retransmission configuration indicating whether a group-common retransmission scheme or a unicast retransmission scheme may be to be used, where the DCI message schedules either the group-common retransmission or the unicast retransmission in accordance with the SPS retransmission configuration.

Some examples of the method, apparatuses, and non-transitory computer-readable medium described herein may further include operations, features, means, or instructions for transmitting a different unicast transmission in accordance with a second SPS configuration different from the first SPS configuration, where the unicast transmission and the group-common transmission may be scheduled in a same TTI and transmitting a second DCI message scheduling a retransmission of the different unicast transmission, where the retransmission of the different unicast transmission and the unicast retransmission of the group-common downlink shared channel correspond to a same feedback process identifier.

Some examples of the method, apparatuses, and non-transitory computer-readable medium described herein may further include operations, features, means, or instructions for determining a capability of the UE to receive the different unicast transmission and the group-common transmission in the same TTI and corresponding to the same feedback process identifier.

Some examples of the method, apparatuses, and non-transitory computer-readable medium described herein may further include operations, features, means, or instructions for receiving an indication of the capability of the UE to receive the different unicast transmission and the group-common transmission in the same TTI and corresponding to the same feedback process identifier.

Some examples of the method, apparatuses, and non-transitory computer-readable medium described herein may further include operations, features, means, or instructions for transmitting the retransmission of the different unicast transmission and transmitting the unicast retransmission of the group-common downlink shared channel.

In some examples of the method, apparatuses, and non-transitory computer-readable medium described herein, the unicast retransmission of the group-common downlink shared channel and the retransmission of the different unicast transmission each may have different feedback process identifiers.

Some examples of the method, apparatuses, and non-transitory computer-readable medium described herein may further include operations, features, means, or instructions for transmitting the retransmission of the different unicast transmission and the unicast retransmission in different TTIs, where the unicast retransmission of the group-common downlink shared channel and the retransmission of the different unicast transmission share a same feedback process identifier.

Some examples of the method, apparatuses, and non-transitory computer-readable medium described herein may further include operations, features, means, or instructions for transmitting an indicator in the DCI message scheduling the unicast retransmission of the group-common downlink shared channel, the indicator differentiating between the unicast retransmission of the group-common downlink shared channel and the retransmission of the different unicast transmission.

In some examples of the method, apparatuses, and non-transitory computer-readable medium described herein, the unicast retransmission of the group-common downlink shared channel and the retransmission of the different unicast transmission may be each associated with the same feedback process identifier but may be each associated with different RNTIs.

In some examples of the method, apparatuses, and non-transitory computer-readable medium described herein, the unicast retransmission of the group-common downlink shared channel and the retransmission of the different unicast transmission correspond to the second RNTI.

In some examples of the method, apparatuses, and non-transitory computer-readable medium described herein, the first RNTI includes a group configured scheduling RNTI.

In some examples of the method, apparatuses, and non-transitory computer-readable medium described herein, the second RNTI includes a configured scheduling RNTI.

DETAILED DESCRIPTION

Figure 1:
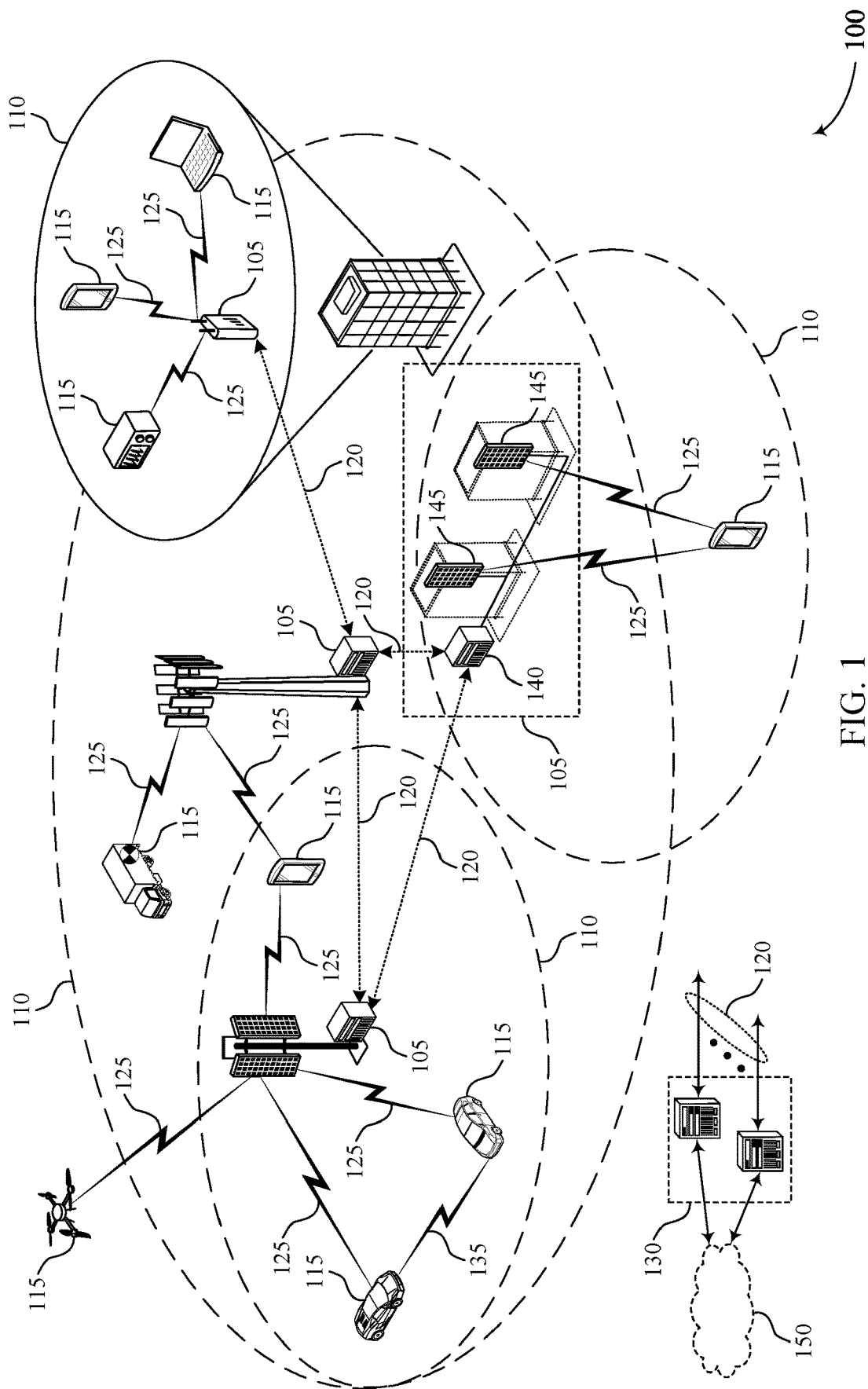
FIG. 1 illustrates an example of a wireless communications system that supports retransmission of semi-persistent scheduled group common downlink signaling in accordance with aspects of the present disclosure.

In some examples, communications between wireless devices (e.g., between a base station and one or more user equipments (UEs)) can be split into two categories: point-to-point (PTP) communications (e.g., unicast communications) and point-to-multipoint (PTM) communications (e.g., multicast communications, broadcast communications, etc.). For PTM communications (e.g., a PTM transmission scheme 1 or 2) and for connected UEs in a same multicast/broadcast services (MBS) group, a base station may use a group-common downlink control channel with a cyclic redundancy check (CRC) scrambled by a group-common radio network temporary identifier (RNTI) to schedule a group-common downlink shared channel which is scrambled with the same group-common RNTI. This scheme may be called a group-common downlink control channel-based group scheduling scheme.

Additionally, the UEs receiving these PTM communications may support transmitting acknowledgment feedback to indicate whether the PTM communications (e.g., multicast messages) were successfully received or not. In some cases, the PTM communications may be transmitted using broader (e.g., non-UE-specific) beams so that all UEs in the MBS group can receive the multicast data. However, if at least one UE transmits a negative acknowledgment (NACK) message, the base station may retransmit the multicast data. The UEs may receive the retransmissions.

In some cases, the base station may retransmit the multicast data as a unicast transmission to a single UE. In other cases, the base station may retransmit the multicast data as a multicast transmission to one or more UEs.

In some cases, individual UEs in the group may also receive an initial unicast transmission, which may correspond to a different semi-persistent scheduling (SPS) configuration that the initial multicast or group-common transmission. The initial unicast transmission and the group-common transmission may correspond to a same hybrid automatic repeat request (HARQ) process identifier (HPID). Thus, retransmissions of the unicast transmission or the group-common retransmission may collide in a same slot, or may arrive in different slots. However, as the retransmissions correspond to same HPIDs, the UE may have difficulty receiving and differentiating both messages.

Thus, the UE or the base station or both may attempt to differentiate the retransmissions for successful and efficient receipt by the UE. If the UE is incapable of receiving both retransmissions, the UE may determine a priority level of each transmission, and receive the retransmission based on the priority level.

If the UE is capable of receiving both retransmissions, the UE may still need to differentiate the retransmissions, and determine which retransmission corresponds to which initial transmission (e.g., the initial unicast or the initial group-common). In these cases, the base station may provide a differentiating indicator in downlink control information scheduling one or both of the retransmissions, or in different DCI messages for each retransmission. The base station may also use a different RNTI for each transmission. For example, the base station may use a G-CS-RNTI for the retransmission of the multicast or group-common transmission, and the base station may use a CS-RNTI for the retransmission of the unicast transmission.

Aspects of the disclosure are initially described in the context of wireless communications systems. Aspects of the disclosure are then described in the context of slot diagrams and process flows. Aspects of the disclosure are further illustrated by and described with reference to apparatus diagrams, system diagrams, and flowcharts that relate to retransmission of semi-persistent scheduled group common downlink signaling.

FIG. 1 illustrates an example of a wireless communications system 100 that supports retransmission of semi-persistent scheduled group common downlink signaling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive, from a base station 105, one or more retransmissions of an initial group-common transmission, where the initial group-common transmission may correspond to a G-CS-RNTI. The UE 115 may receive, from the base station 105 and in accordance with a first SPS configuration, a group-common transmission of a group-common downlink shared channel, the group-common transmission being associated with a first RNTI (e.g., the G-CS-RNTI). The UE 115 may transmit, to the base station 105, feedback information for the group-common transmission. The feedback information may include HARQ feedback, including an ACK or a NACK. The UE 115 may then receive a DCI message scheduling either a group-common retransmission of the group-common downlink shared channel or a unicast retransmission of the group-common downlink shared channel. The DCI may indicate that either the group-common retransmission is associated with the first RNTI or that the unicast retransmission is associated with a second RNTI that may be different from the first RNTI.

Figure 2:
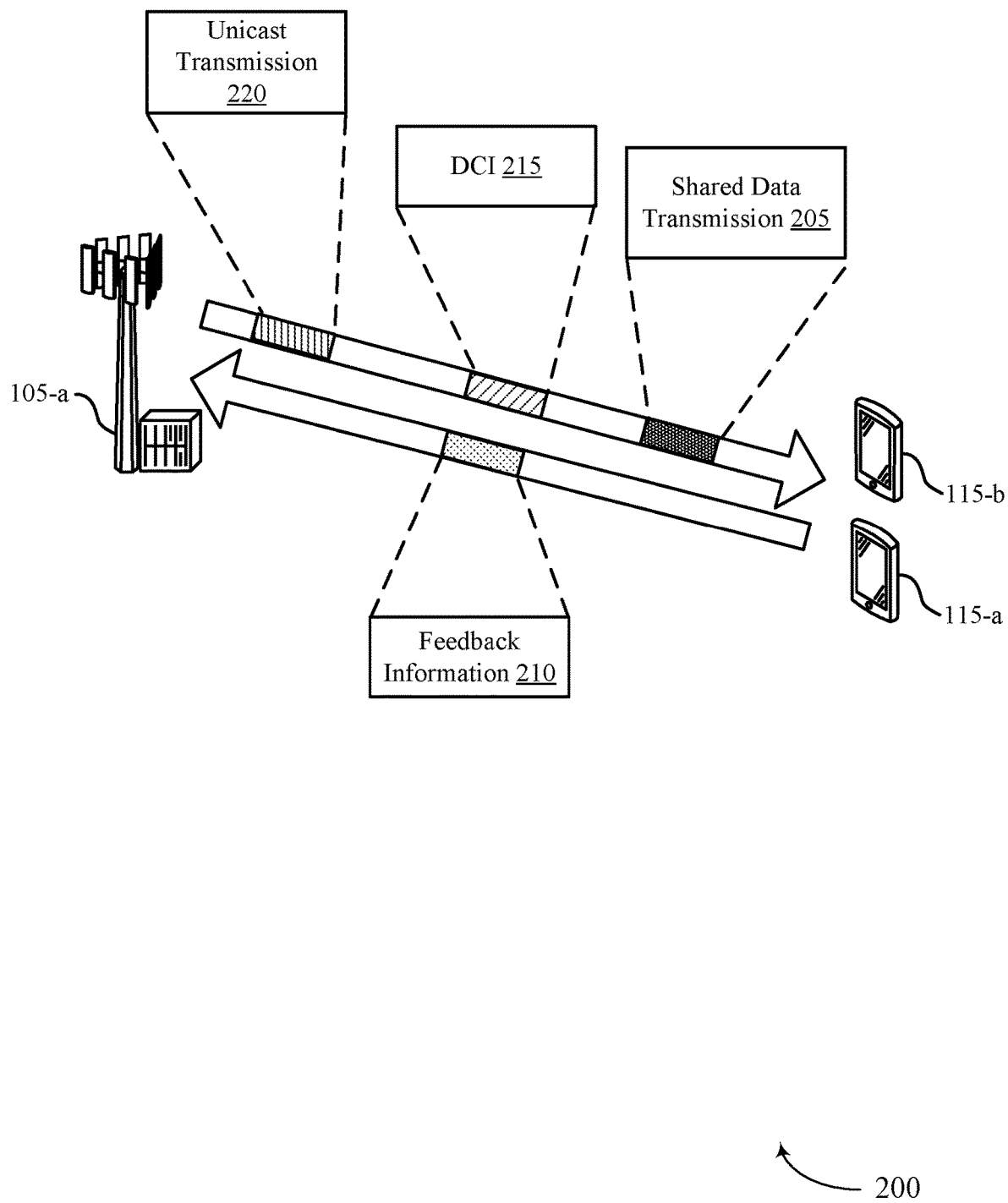
FIG. 2 illustrates an example of a wireless communications system that supports retransmission of semi-persistent scheduled group common downlink signaling in accordance with aspects of the present disclosure.

FIG. 2 illustrates an example of a wireless communications system 200 that supports retransmission of semi-persistent scheduled group common downlink signaling in accordance with aspects of the present disclosure. Wireless communications system 200 may implement aspects of or may be implemented by aspects of wireless communications system 100. For example, wireless communications system 200 may include a base station 105-a and one or more UEs 115, including UE 115-a and UE 115-b, which may represent examples of base stations 105 and UEs 115, respectively, as described with reference to FIG. 1.

In some examples, the one or more UEs 115 may be part of a same group (e.g., an MBS group) that receives same multicast or broadcast data from base station 105-a. For example, base station 105-a may transmit multicast data to the one or more UEs 115, including UE 115-a and UE 115-b using a type of PTM communications.

Base station 105-a may transmit both an initial transmission and any subsequent retransmissions for a multicast physical downlink shared channel (PDSCH) (e.g., shared data channel transmission, multicast data transmission, etc.) using the first type of PTM communications (e.g., PTM transmission scheme 1). Base station 105-a may transmit a shared data transmission 205 (e.g., multicast PDSCH) using a group-common RNTI (e.g., a G-CS-RNTI) that is not UE-specific. For example, the techniques described herein may enable a group-common downlink control channel (e.g., group-common PDCCH) with a CRC scrambled by a group-common RNTI to schedule a group-common downlink shared channel (e.g., group-common PDSCH, shared data transmission 205, multicast PDSCH, multicast data, etc.) which is scrambled with the same group-common RNTI specific to a UE 115 (e.g., or a subset of UEs 115 in the same MBS group).

In some implementations, one or more UEs 115 of the group that receives same multicast or broadcast data from base station 105-a may also receive unicast transmissions from base station 105-a, along with multicast transmissions or group-common transmission.

Base station 105-a may transmit an initial transmission of shared data transmission 205 to a group of UEs 115 including UE 115-a and UE 115-b. The transmission of shared data transmission 205 may be in accordance with a first SPS configuration. Shared data transmission 205 may also be associated with a first RNTI, such as a G-CS-RNTI. UE 115-a may attempt to receive and decode shared data transmission 205. Based on the success of receiving and decoding shared data transmission, UE 115-a may transmit feedback information 210. The initial transmission of shared data transmission 205 may correspond to a feedback identifier, such as a HPID.

Base station 105-a may receive feedback information 210. In cases where feedback information 210 includes a NACK, base station 105-a may transmit DCI 215 scheduling a retransmission of shared data transmission 205. The retransmission of shared data transmission 205 may be scheduled as a group-common (e.g., PTM) transmission or a unicast transmission (e.g., PTP) transmission.

In some cases, base station 105-*a* may also transmit an initial unicast transmission 220. In some cases, the initial unicast transmission 220 may be transmitted in a same TTI or slot as the initial shared data transmission 205. The initial unicast transmission 220 may also be transmitted in a different TTI. In some cases, the unicast transmission 220 may correspond to a same HPID as the shared data transmission 205. The unicast transmission 220 may be transmitted in accordance with a second SPS configuration that is different from the SPS configuration associated with the shared data transmission 205.

UE 115-*a* may attempt to receive and decode unicast transmission 220. UE 115-*a* may also transmit feedback information 210 to base station 105-*a*, which may include an ACK or a NACK. Base station 105-*a* may then also transmit a DCI scheduling a retransmission of the unicast transmission 220.

In some cases the retransmission of the shared data transmission 205 (e.g., the group-common transmission) and the retransmission of the unicast transmission 220 may be scheduled using the same HPID. Additionally, the retransmission of the shared data transmission 205 may be scheduling as a unicast (e.g., PTP) transmission, or group-common (multicast) transmission (e.g., PTM). Thus, in some cases, UE 115-*a* may receive two retransmissions of different messages using the same HPID.

In some cases, UE 115-*a* may be incapable of receiving more than one SPS transmission in a same slot. In some of these cases, UE 115-*a* may treat the collision of the two SPS transmissions as an error case. In other cases, UE 115-*a* may determine which retransmission to receive based on a priority. For example, UE 115-*a* may determine the priority based on RRC signaling corresponding to the SPS transmissions. UE 115-*a* may also determine the priority based on DCI signaling. For example, UE 115-*a* may determine priority based on a DCI priority indication included in a field of the DCI (e.g., DCI 1_1 or DCI 1_2, for SPS activation). UE 115-*a* may also determine which retransmission to receive based on the SPS configuration identifier. For example, UE 115-*a* may determine to receive the retransmission for the SPS transmissions scheduled without PDCCH with a lower SPS configuration identifier. UE 115-*a* may determine the priority based on the SPS configuration identifier in cases where there is no priority indication in RRC or DCI, or if the configured priority indication in RRC or DCI is the same for both SPS transmissions.

In other cases, UE 115-*a* may be capable of receiving both SPS transmissions in a same slot, sharing the same HPID. In these cases, UE 115-*a* may receive the retransmission for one of the SPS transmissions, but may still need to differentiate which SPS transmission the retransmission is associated with, as the retransmissions may share a same HPID. In these cases, the unicast retransmission of the shared data transmission 205 may be pre-defined with a CS-RNTI. Additionally or alternatively, DCI 215 or another DCI scheduling the retransmission of the separate unicast transmission 220 may include an indicator bit differentiating the unicast retransmission of the shared data transmission 205 from the retransmission of the separate unicast transmission 220, in cases where the unicast transmission 220 and the shared data transmission 205 share the same HPID. The DCI may include a bit format that differentiates between C-RNTI PTP retransmissions for multicast transmissions (e.g., shared data transmission 205) and C-RNTI PTP retransmission of unicast transmission 220. This bit may be reused. Thus, UE 115-*a* may decode and differentiate the retransmissions of the SPS transmission based on the predefinition or the indication in the DCI.

Additionally, a different RNTI may be used by base station 105-*a* to differentiate between the retransmission of shared data transmission 205 and retransmission of unicast transmission 220. For example, the retransmission of shared data transmission 205 may correspond to a G-CS-RNTI mapping in the UE-specific search space or some other RNTI different than CS-RNTI, and the retransmission of unicast transmission 220 may correspond to a CS-RNTI. Thus, UE 115-*a* may receive both retransmissions, and may decode and differentiate the retransmissions based on the different RNTIs. For example, base station 105-*a* may determine which RNTI to use for which retransmission based on receiving feedback for two transmissions with a same HPID from UE 115-*a*.

Additionally, in some cases, UE 115-*a* may transmit an indication of a capability of UE 115-*a* to receive two retransmissions, corresponding to a same HPID. Base station 105-*a* may determine a differentiating process (e.g., pre-definition, DCI indicator, or different RNTIs) based on the capability of UE 115-*a*.

Further, in some cases, base station 105-*a* may transmit a SPS retransmission configuration indication. The SPS retransmission configuration indication may indicate to UE 115-*a* whether a group-common retransmission scheme of shared data transmission 205 is used, or a unicast retransmission scheme of shared data transmission 205 is used. The DCI 215 may then schedule either the group-common retransmission, or the unicast retransmission of shared data transmission 205 in accordance with the SPS retransmission configuration indication.

Figure 3:
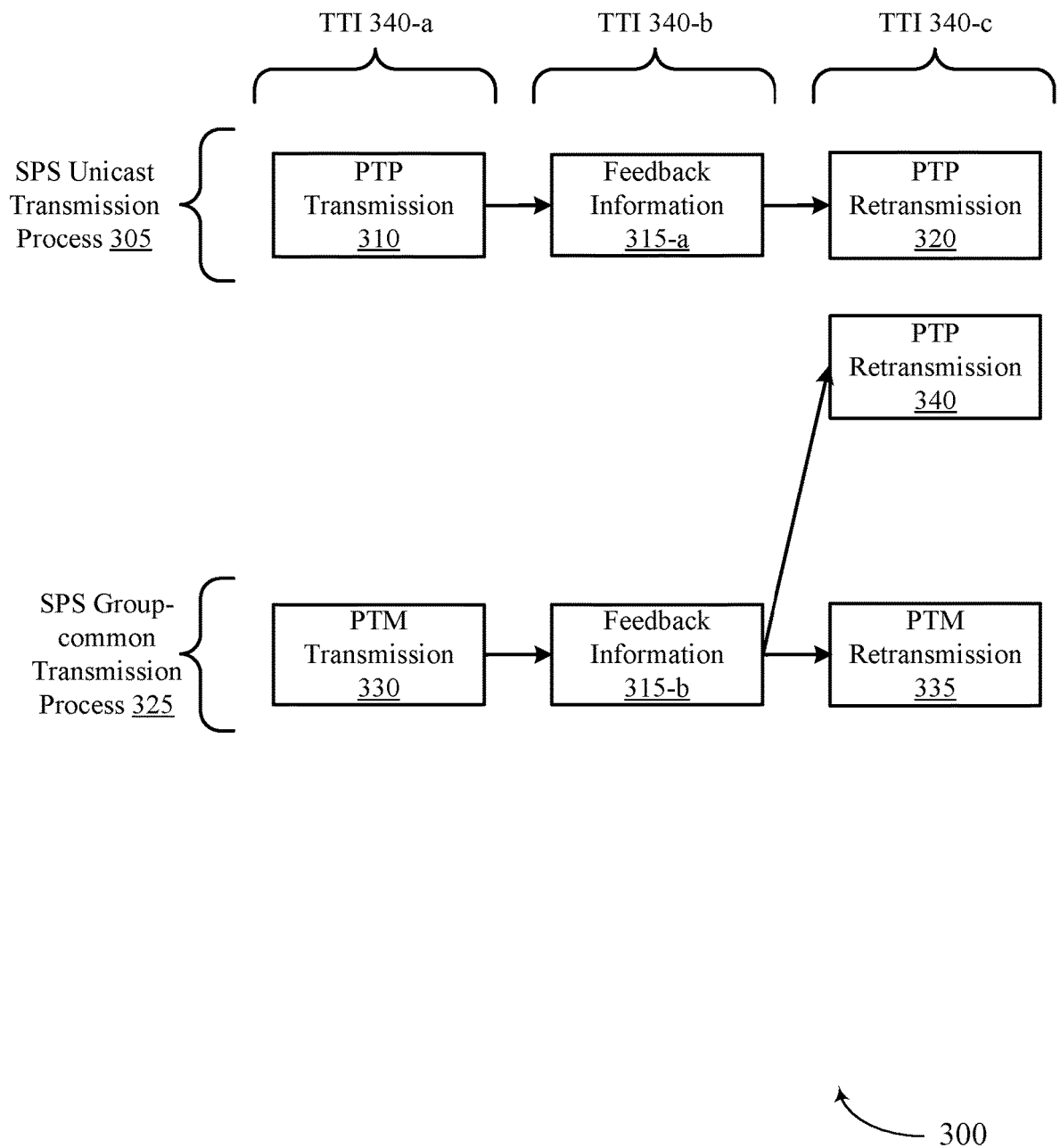
FIG. 3 illustrates an example of a slot diagram that supports retransmission of semi-persistent scheduled group common downlink signaling in accordance with aspects of the present disclosure.

FIG. 3 illustrates an example of a slot diagram 300 that supports retransmission of semi-persistent scheduled group common downlink signaling in accordance with aspects of the present disclosure. Slot diagram 300 may illustrate an order of signals transmitted and received between a UE 115 and a base station 105.

A UE 115 may receive both SPS unicast (e.g., PTP) transmissions from a base station 105 and SPS group-common (e.g., PTM or multicast or broadcast) transmissions from a base station 105. In many cases, a UE 115 may be configured to transmit HARQ feedback in response to attempting to receive and decode downlink unicast and multicast messages.

For example, a UE 115 may receive unicast messages in an SPS unicast transmission process 305. The UE 115 may receive a first PTP transmission 310 from a base station 105 in TTI 340-*a* (TTI 340-*a* may be, for example, a slot). The UE may then transmit feedback information 315-*a* in TTI 340-*b* (TTI 340-*b* may also be, for example, a slot). In cases where feedback information 315-*a* includes a NACK, base station 105 may transmit PTP retransmission 320 to the UE 115 in TTI 340-*c* (for example, a slot). The UE 115 may then attempt to decode the PTP retransmission 320.

Additionally or alternatively, the UE 115 may receive group-common messages in an SPS group-common transmission process 325. The UE 115 may receive a first PTM transmission 330 from a base station 105 in TTI 340-*a*. The UE may then transmit feedback information 315-*b* in TTI 340-*b*. In cases where feedback information 315-*b* includes a NACK, base station 105 may transmit a group-common retransmission to the UE 115 in TTI 340-*c*. As described with respect to FIG. 2, the group-common retransmission may be a PTM retransmission 335 or a PTP retransmission 340. The UE 115 may then attempt to decode the group-common retransmission.

Each of SPS unicast transmission process 305 and SPS group-common transmission process 325 may correspond to different SPS configurations. In both cases, the initial transmission (e.g., PTP transmission 310 and PTM transmission 330) may not have been scheduled by DCI or other control signaling.

In some cases, both the SPS unicast transmission process 305 and the SPS group-common transmission process 325 may occur at overlapping times, such as in overlapping TTIs 340. For example, PTP transmission 310 and PTM transmission 330 may both occur in an initial same TTI 340-a. The collision may be caused by the fact that neither transmission may be initially scheduled by control signaling (e.g., DCI) in many cases. Thus, for the subsequent feedback process, PTP transmission 310 and PTM transmission 330 may correspond to a same HPID. Then, PTP retransmission 320 and PTM retransmission 335 or PTP retransmission 340 may be scheduled in a same TTI 340-c or different TTIs 340, but may correspond to a same HPID. Further, while PTM retransmission 335 may utilize a G-CS-RNTI for scrambling a CRC of the PTM retransmission 335, PTP retransmission 340 may utilize a CS-RNTI for scrambling its CRC. PTP retransmission 330 will also use a CS-RNTI for scrambling its CRC. Therefore, in these cases, as both the PTP retransmission 330 and PTP retransmission 340 correspond to a same HPID and, potentially, the same CS-RNTI, the UE 115 may use methods to distinguish between the retransmissions, or prioritize which transmissions to receive.

For example, UE 115 may determine whether to receive PTP retransmission 320 or PTP retransmission 340 based on a priority level of each retransmission. The priority level may be based on signaling in DCI messages scheduling each retransmission, RRC signaling, or SPS configuration signaling. The UE 115 could also treat the collision of SPS unicast transmission process 305 and the SPS group-common transmission process 325 in the same TTI 340 (or different TTIs) and using a same HPID as an error case.

In other examples, where a UE 115 is capable of receiving both retransmissions, the base station 105 may provide additional signaling or indications to distinguish the retransmissions. The UE 115 may receive either of PTP retransmission 320 or PTP retransmission 340 in different TTIs, and may still need to differentiate or determine which initial transmission the retransmission corresponds to. The base station 105 may determine RNTIs to use for each retransmission in TTI 340-c. The base station 105 may use a different RNTI for each retransmission. The base station 105 may also differentiate the retransmissions using signaling (e.g., a flag bit) in DCI transmissions scheduling the retransmissions.

Figure 4:
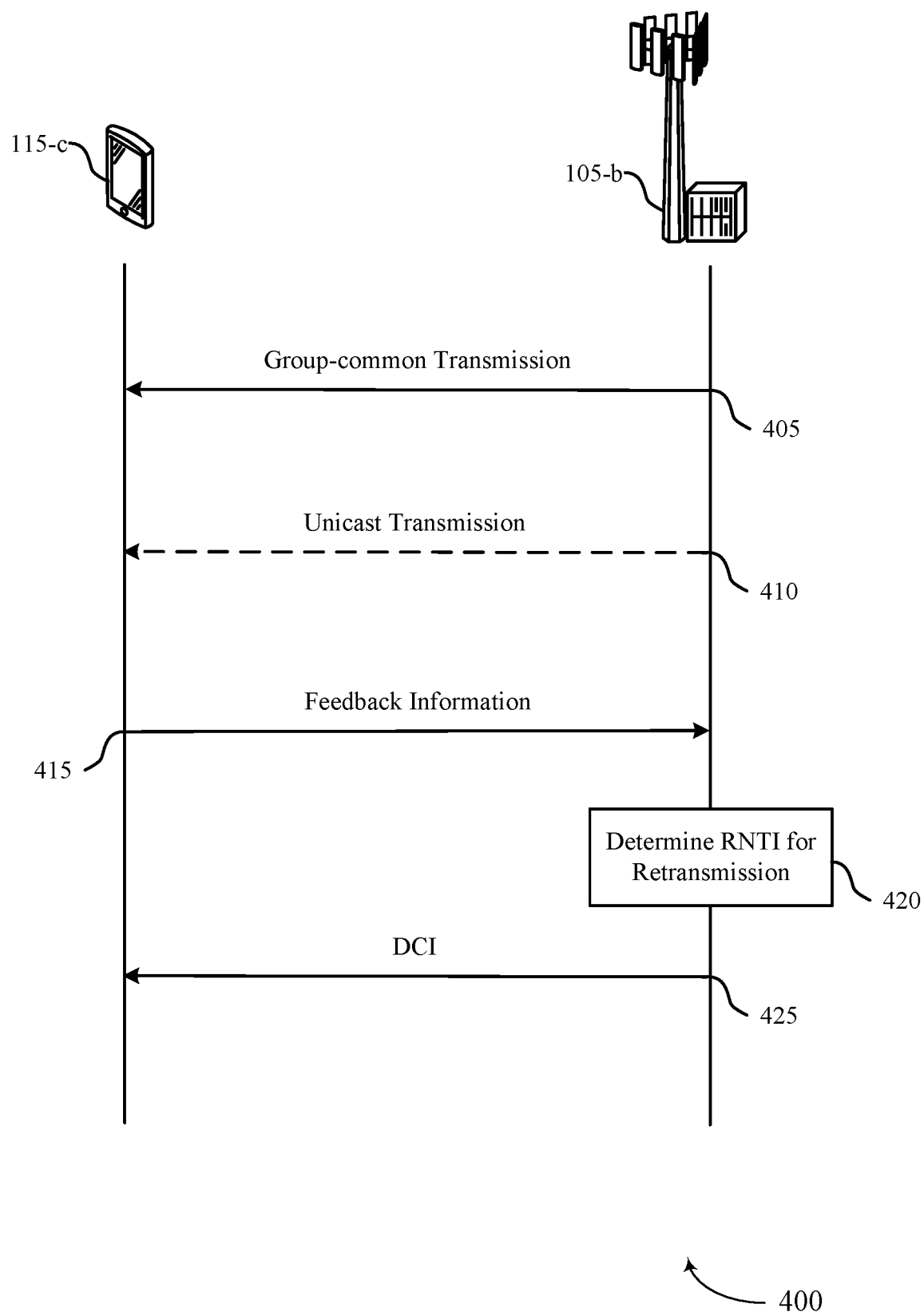
FIG. 4 illustrates an example of a process flow that supports retransmission of semi-persistent scheduled group common downlink signaling in accordance with aspects of the present disclosure.

FIG. 4 illustrates an example of a process flow 400 that supports retransmission of semi-persistent scheduled group common downlink signaling in accordance with aspects of the present disclosure. UE 115-c may be an example of a UE 115 as described with respect to FIGS. 1 through 3. Base station 105-b may be an example of a base station 105 as described with respect to FIGS. 1 and 2. Base station 105-b may communicate with one or more UEs 115, including UE 115-c. Base station 105-b may transmit downlink multicast and unicast signals to the UEs 115. UE 115-c may receive signals from base station 105-b, and may transmit signals to base station 105-b.

At 405, UE 115-c may receive, in accordance with a first SPS configuration, a group-common (e.g., multicast) transmission of a group-common downlink shared channel (e.g., PDSCH). The group-common transmission may be associated with a first RNTI (e.g., a G-CS-RNTI).

In some cases, at 410, UE 115-c may receive a different unicast transmission in accordance with a second SPS configuration different from the first SPS configuration. The unicast transmission and the group-common transmission are scheduled in a same TTI (e.g., slot).

At 415, UE 115-c may transmit feedback information (e.g., a NACK) for the group-common transmission.

At 420, base station 105-b may determine a RNTI to use for retransmission of the group-common transmission.

At 425, UE 115-c may receive a DCI message scheduling either a group-common retransmission of the group-common PDSCH, or a unicast retransmission of the group-common PDSCH. The DCI message may indicate that either the group-common retransmission is associated with the first RNTI (e.g., the G-CS-RNTI) or that the unicast retransmission is associated with a second RNTI (e.g., a CS-RNTI). The second RNTI may be different from the first RNTI. For example, the first RNTI may be a G-CS-RNTI, and the second RNTI may be a CS-RNTI.

In cases where UE 115-c receives a different unicast transmission at 410, UE 115-c may receive an additional DCI message scheduling a retransmission of the different unicast transmission. The retransmission of the different unicast transmission and the unicast retransmission of the group-common PDSCH may correspond to a same feedback process identifier (e.g., a HPID).

In cases where UE 115-c receives a different unicast transmission at 410, UE 115-c may determine a first priority level of the group-common transmission and a second priority level of the different unicast transmission, based on RRC signaling, DCI signaling, or both. UE 115-c may then receive either the unicast retransmission of the group-common downlink shared channel (e.g., PDSCH), or the UE 115-c may receive the retransmission of the different unicast transmission based on relative values of the first priority level and the second priority level. For example, UE 115-c may determine which retransmission to monitor for and receive.

In other cases, UE 115-c may determine a first SPS configuration identifier corresponding to the group-common transmission and a second SPS configuration identifier corresponding to the different unicast transmission. UE 115-c may then receive either the unicast retransmission of the group-common downlink shared channel, or the retransmission of the different unicast transmission based on relative values of the first SPS configuration identifier and the second SPS configuration identifier.

In some cases, UE 115-c may receive both the unicast retransmission of the group-common downlink shared channel, and the retransmission of the different unicast transmission. UE 115-c may be capable in these cases of receiving both the unicast retransmission of the group-common downlink shared channel, and the retransmission of the different unicast transmission. In some cases, UE 115-c may transmit an indication of a capability of UE 115-c to receive the different unicast transmission and the group-common transmission in the same TTI and corresponding to the same feedback process identifier.

In some cases where UE 115-c receives both the unicast retransmission of the group-common downlink shared channel and the retransmission of the different unicast transmission, the unicast retransmission of the group-common downlink shared channel and the retransmission of the different unicast transmission may have different feedback process identifiers (e.g., HPIDs).

In some cases where UE 115-c receives both the unicast retransmission of the group-common downlink shared channel and the retransmission of the different unicast transmission, the unicast retransmission of the group-common downlink shared channel, and the retransmission of the different unicast transmission may be associated with a same feedback process identifiers and the same RNTIs. In these cases, UE 115-c may receive an indicator in the additional DCI message scheduling the unicast retransmission of the group-common downlink shared channel. The indicator may differentiate between the unicast retransmission of the group-common downlink shared channel and the retransmission of the different unicast transmission.

In some cases where UE 115-c receives both the unicast retransmission of the group-common downlink shared channel and the retransmission of the different unicast transmission, the unicast retransmission of the group-common downlink shared channel and the retransmission of the different unicast transmission may be associated with the same feedback process identifier, but may be associated with different RNTIs.

In some cases, UE 115-c may receive the retransmission of the different unicast transmission and the unicast retransmission in different TTIs. The unicast retransmission of the group-common downlink shared channel and the retransmission of the different unicast transmission may share a same feedback process identifier.

In some cases, UE 115-c may receive a SPS retransmission configuration indicating whether a group-common retransmission scheme or a unicast retransmission scheme is to be used. The DCI message received at 415 may then schedule the group-common retransmission or the unicast retransmission in accordance with the SPS scheduling retransmission configuration.

Figure 5:
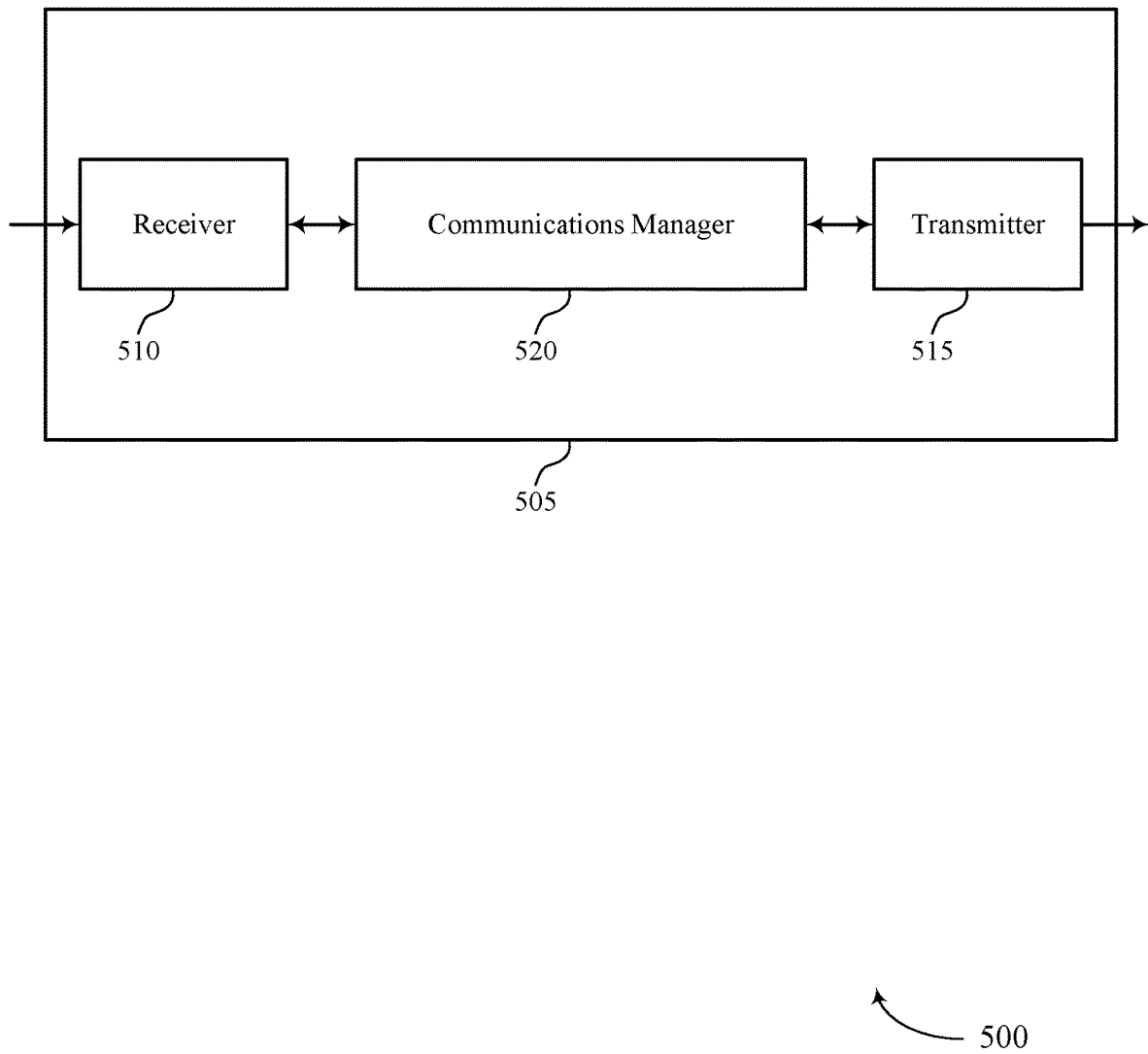
FIGS. 5 and 6 show block diagrams of devices that support retransmission of semi-persistent scheduled group common downlink signaling in accordance with aspects of the present disclosure.

FIG. 5 shows a block diagram 500 of a device 505 that supports retransmission of semi-persistent scheduled group common downlink signaling in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to retransmission of semi-persistent scheduled group common downlink signaling). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to retransmission of semi-persistent scheduled group common downlink signaling). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of retransmission of semi-persistent scheduled group common downlink signaling as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, in accordance with a first SPS configuration, a group-common transmission of a group-common downlink shared channel, the group-common transmission being associated with a first RNTI. The communications manager 520 may be configured as or otherwise support a means for transmitting feedback information for the group-common transmission. The communications manager 520 may be configured as or otherwise support a means for receiving a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improved communications efficiency at the device 405, by improving techniques to differentiate messages and allow for the device 405 to receive and decode multiple retransmissions, or prioritize retransmissions.

Figure 6:
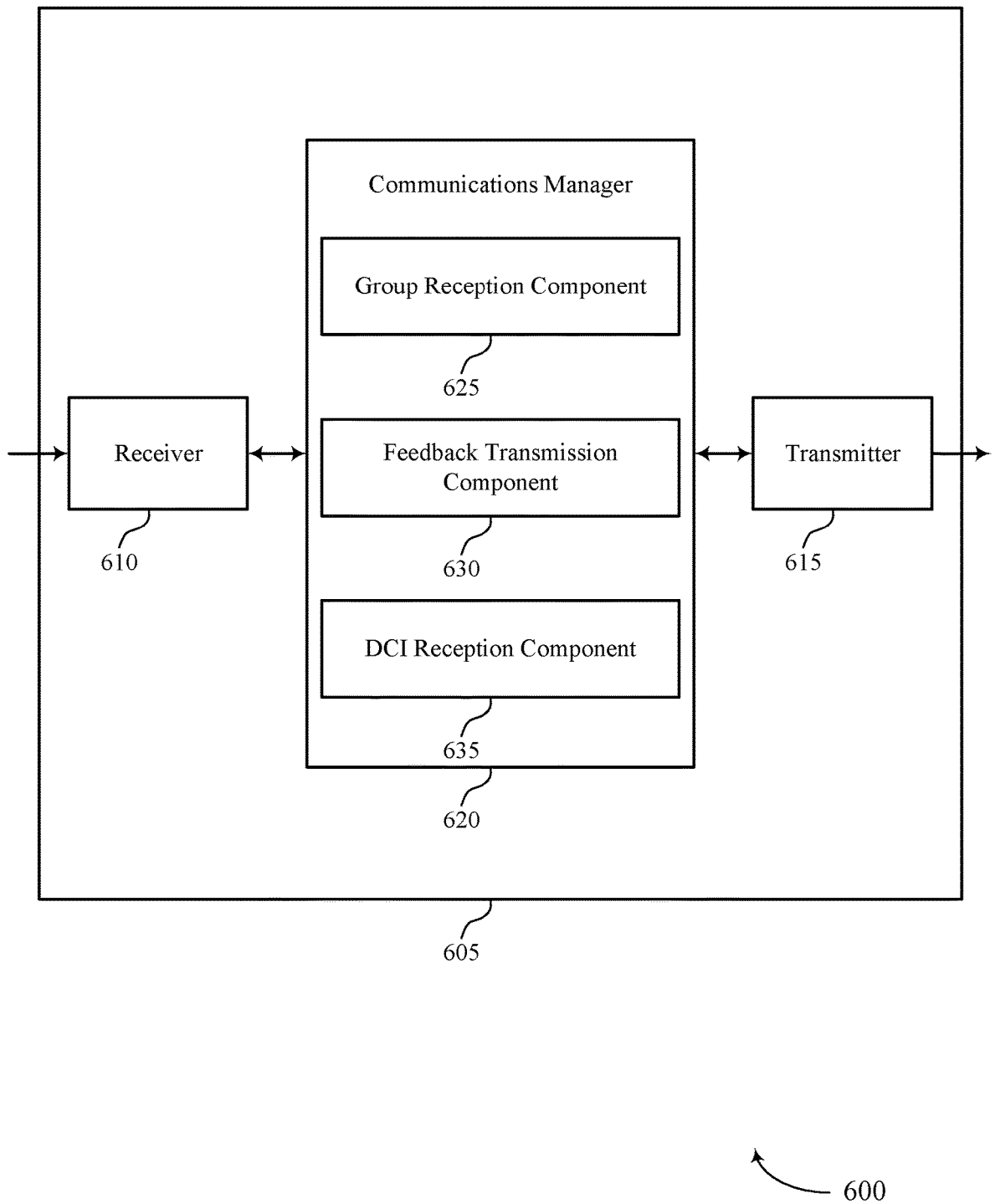

FIG. 6 shows a block diagram 600 of a device 605 that supports retransmission of semi-persistent scheduled group common downlink signaling in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to retransmission of semi-persistent scheduled group common downlink signaling). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to retransmission of semi-persistent scheduled group common downlink signaling). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of retransmission of semi-persistent scheduled group common downlink signaling as described herein. For example, the communications manager 620 may include a group reception component 625, a feedback transmission component 630, a DCI reception component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The group reception component 625 may be configured as or otherwise support a means for receiving, in accordance with a first SPS configuration, a group-common transmission of a group-common downlink shared channel, the group-common transmission being associated with a first RNTI. The feedback transmission component 630 may be configured as or otherwise support a means for transmitting feedback information for the group-common transmission. The DCI reception component 635 may be configured as or otherwise support a means for receiving a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

Figure 7:
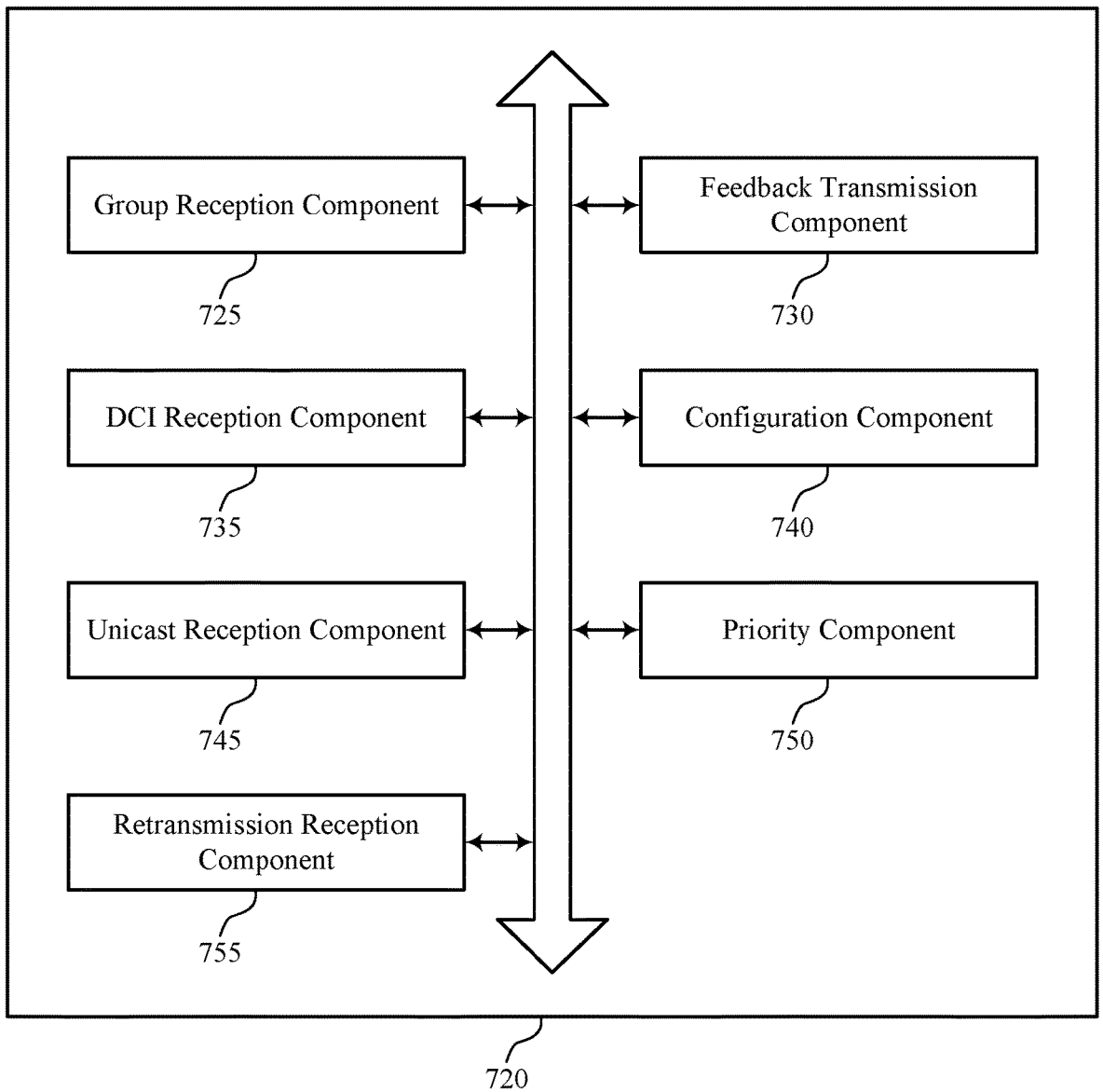
FIG. 7 shows a block diagram of a communications manager that supports retransmission of semi-persistent scheduled group common downlink signaling in accordance with aspects of the present disclosure.

FIG. 7 shows a block diagram 700 of a communications manager 720 that supports retransmission of semi-persistent scheduled group common downlink signaling in accordance with aspects of the present disclosure. The communications manager 720 may be an example of aspects of a communications manager 520, a communications manager 620, or both, as described herein. The communications manager 720, or various components thereof, may be an example of means for performing various aspects of retransmission of semi-persistent scheduled group common downlink signaling as described herein. For example, the communications manager 720 may include a group reception component 725, a feedback transmission component 730, a DCI reception component 735, a configuration component 740, a unicast reception component 745, a priority component 750, a retransmission reception component 755, or any combination thereof. Each of these components may communicate, directly or indirectly, with one another (e.g., via one or more buses).

The communications manager 720 may support wireless communications at a UE in accordance with examples as disclosed herein. The group reception component 725 may be configured as or otherwise support a means for receiving, in accordance with a first SPS configuration, a group-common transmission of a group-common downlink shared channel, the group-common transmission being associated with a first RNTI. The feedback transmission component 730 may be configured as or otherwise support a means for transmitting feedback information for the group-common transmission. The DCI reception component 735 may be configured as or otherwise support a means for receiving a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

In some examples, the configuration component 740 may be configured as or otherwise support a means for receiving a SPS retransmission configuration indicating whether a group-common retransmission scheme or a unicast retransmission scheme is to be used, where the DCI message schedules either the group-common retransmission or the unicast retransmission in accordance with the SPS retransmission configuration.

In some examples, the unicast reception component 745 may be configured as or otherwise support a means for receiving a different unicast transmission in accordance with a second SPS configuration different from the first SPS configuration, where the unicast transmission and the group-common transmission are scheduled in a same transmission time interval. In some examples, the DCI reception component 735 may be configured as or otherwise support a means for receiving an additional DCI message scheduling a retransmission of the different unicast transmission, where the retransmission of the different unicast transmission and the unicast retransmission of the group-common downlink shared channel correspond to a same feedback process identifier.

In some examples, the priority component 750 may be configured as or otherwise support a means for determining a first priority level of the group-common transmission and a second priority level of the different unicast transmission based on RRC signaling, DCI or a combination thereof. In some examples, the retransmission reception component 755 may be configured as or otherwise support a means for receiving one of the unicast retransmission of the group-common downlink shared channel or the retransmission of the different unicast transmission based on relative values of the first priority level and the second priority level.

In some examples, the priority component 750 may be configured as or otherwise support a means for determining a first SPS configuration identifier corresponding to the group-common transmission and a second SPS configuration identifier corresponding to the different unicast transmission. In some examples, the retransmission reception component 755 may be configured as or otherwise support a means for receiving one of the unicast retransmission of the group-common downlink shared channel or the retransmission of the different unicast transmission based on relative values of the first SPS configuration identifier and the second SPS configuration identifier.

In some examples, the retransmission reception component 755 may be configured as or otherwise support a means for receiving the unicast retransmission of the group-common downlink shared channel. In some examples, the retransmission reception component 755 may be configured as or otherwise support a means for receiving the retransmission of the different unicast transmission.

In some examples, the unicast retransmission of the group-common downlink shared channel and the retransmission of the different unicast transmission each have different feedback process identifiers.

In some examples, the unicast retransmission of the group-common downlink shared channel and the retransmission of the different unicast transmission are each associated with the same feedback process identifier and are each also associated with a same RNTIs, and the DCI reception component 735 may be configured as or otherwise support a means for receiving an indicator in the additional DCI message scheduling the unicast retransmission of the group-common downlink shared channel, the indicator differentiating between the unicast retransmission of the group-common downlink shared channel and the retransmission of the different unicast transmission.

In some examples, the unicast retransmission of the group-common downlink shared channel and the retransmission of the different unicast transmission are each associated with the same feedback process identifier but are each associated with different RNTIs.

In some examples, the retransmission reception component 755 may be configured as or otherwise support a means for receiving the retransmission of the different unicast transmission and the unicast retransmission in different transmission time intervals, where the unicast retransmission of the group-common downlink shared channel and the retransmission of the different unicast transmission share a same feedback process identifier.

In some examples, the retransmission reception component 755 may be configured as or otherwise support a means for transmitting an indication of a capability of the UE to receive the different unicast transmission and the group-common transmission in the same transmission time interval and corresponding to the same feedback process identifier.

In some examples, the first RNTI includes a group configured scheduling RNTI.

In some examples, the second RNTI includes a configured scheduling RNTI.

Figure 8:
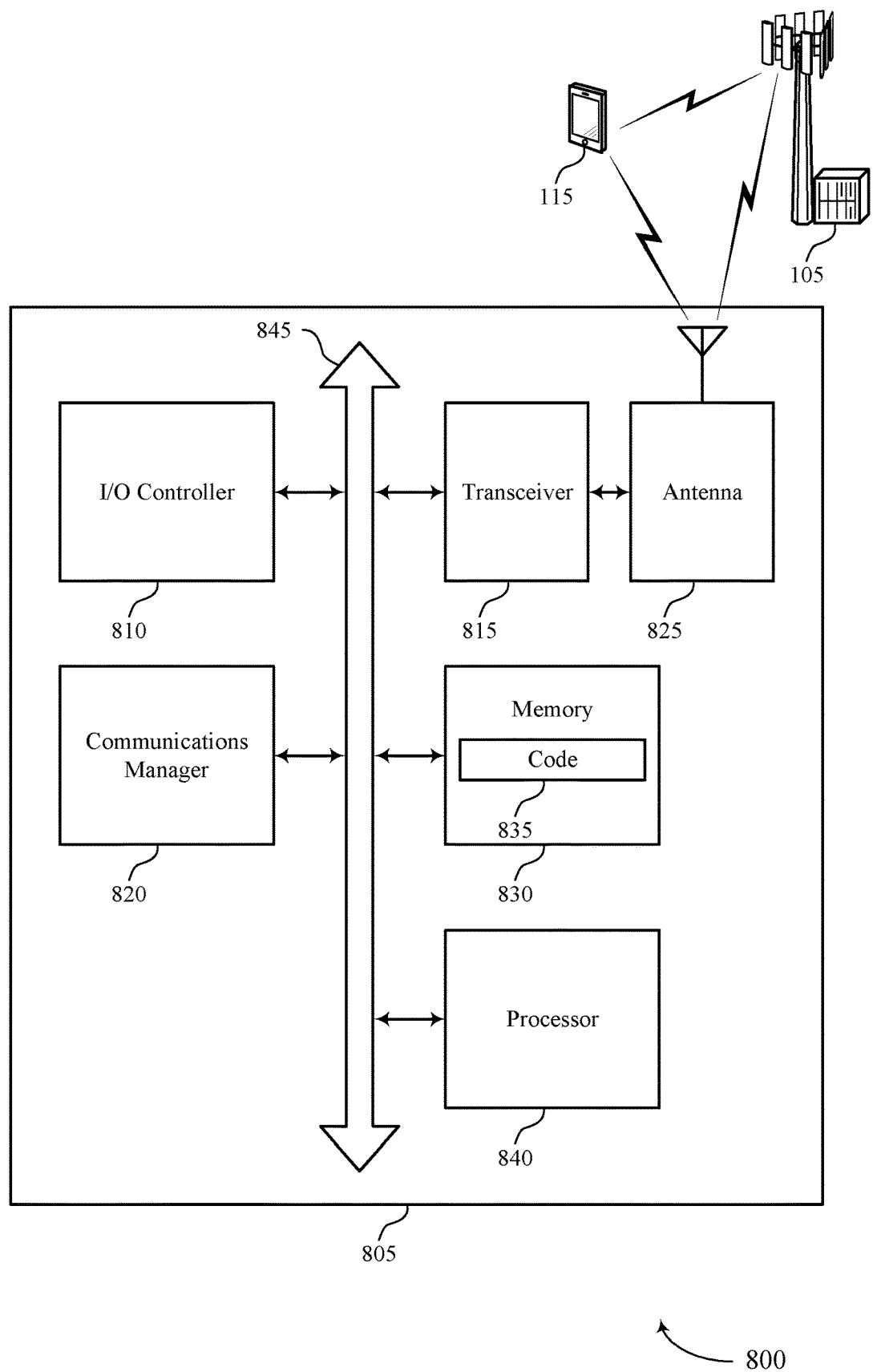
FIG. 8 shows a diagram of a system including a device that supports retransmission of semi-persistent scheduled group common downlink signaling in accordance with aspects of the present disclosure.

FIG. 8 shows a diagram of a system 800 including a device 805 that supports retransmission of semi-persistent scheduled group common downlink signaling in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting retransmission of semi-persistent scheduled group common downlink signaling). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, in accordance with a first SPS configuration, a group-common transmission of a group-common downlink shared channel, the group-common transmission being associated with a first RNTI. The communications manager 820 may be configured as or otherwise support a means for transmitting feedback information for the group-common transmission. The communications manager 820 may be configured as or otherwise support a means for receiving a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

By including or configuring the communications manager 820 in accordance with examples as described herein, the device 805 may support techniques for reduced communications latency at the device 705, by decreasing collisions, or mitigating the effects of collisions by allowing for the device 705 to differentiate or prioritize messages received in a same TTI with a same HPID.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of retransmission of semi-persistent scheduled group common downlink signaling as described herein, or the processor 840 and the memory 830 may be otherwise configured to perform or support such operations.

Figure 9:
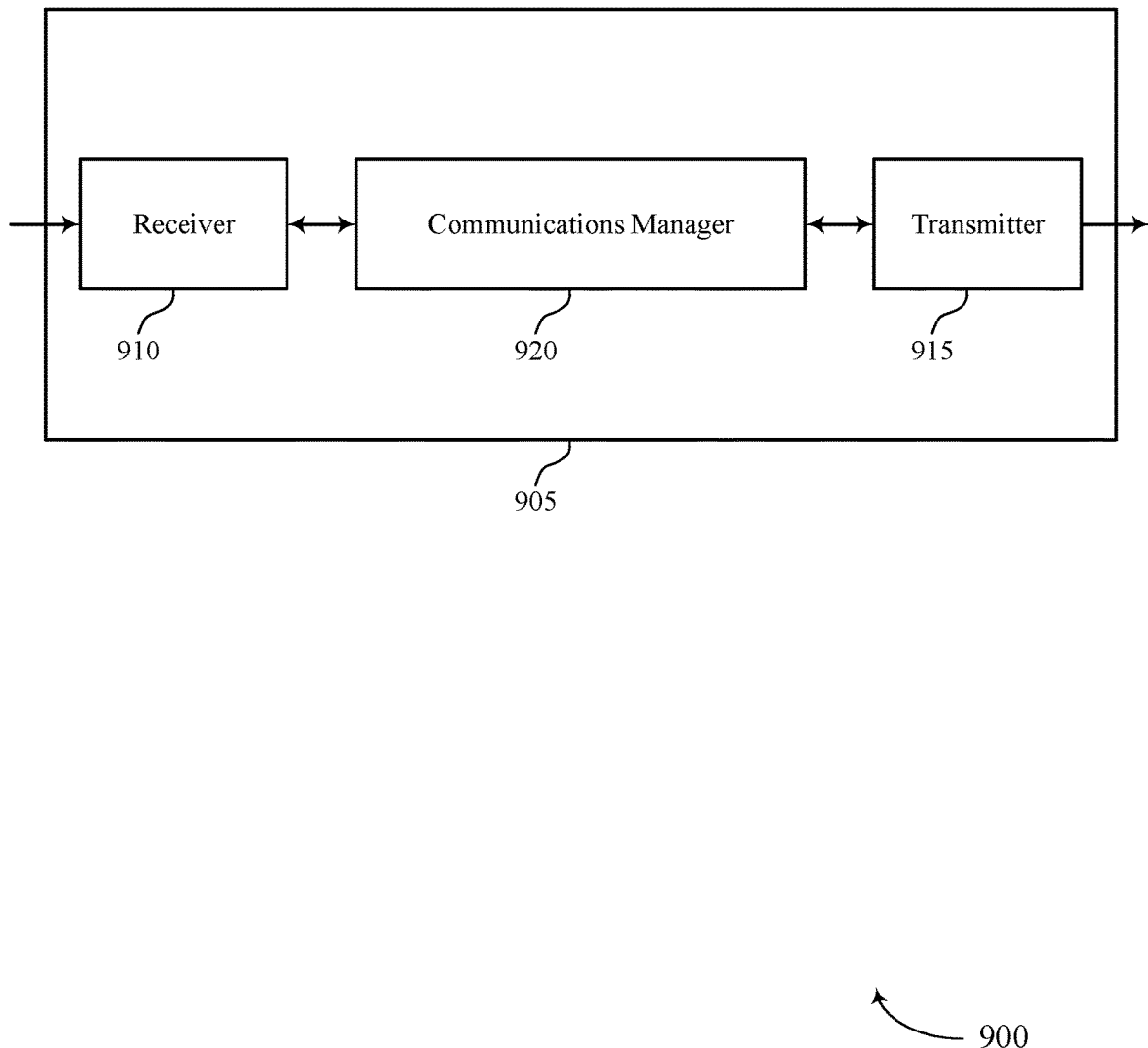
FIGS. 9 and 10 show block diagrams of devices that support retransmission of semi-persistent scheduled group common downlink signaling in accordance with aspects of the present disclosure.

FIG. 9 shows a block diagram 900 of a device 905 that supports retransmission of semi-persistent scheduled group common downlink signaling in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to retransmission of semi-persistent scheduled group common downlink signaling). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to retransmission of semi-persistent scheduled group common downlink signaling). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of retransmission of semi-persistent scheduled group common downlink signaling as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, in accordance with a first SPS configuration, a group-common transmission of a group-common downlink shared channel, the group-common transmission being associated with a first RNTI. The communications manager 920 may be configured as or otherwise support a means for receiving feedback information for the group-common transmission. The communications manager 920 may be configured as or otherwise support a means for determining a RNTI to use for a retransmission of the group-common transmission. The communications manager 920 may be configured as or otherwise support a means for transmitting a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption at a device 805, by improving communications efficiency to other device (e.g., devices 405 and 705), thereby decreasing transmission failures and number of retransmissions.

Figure 10:
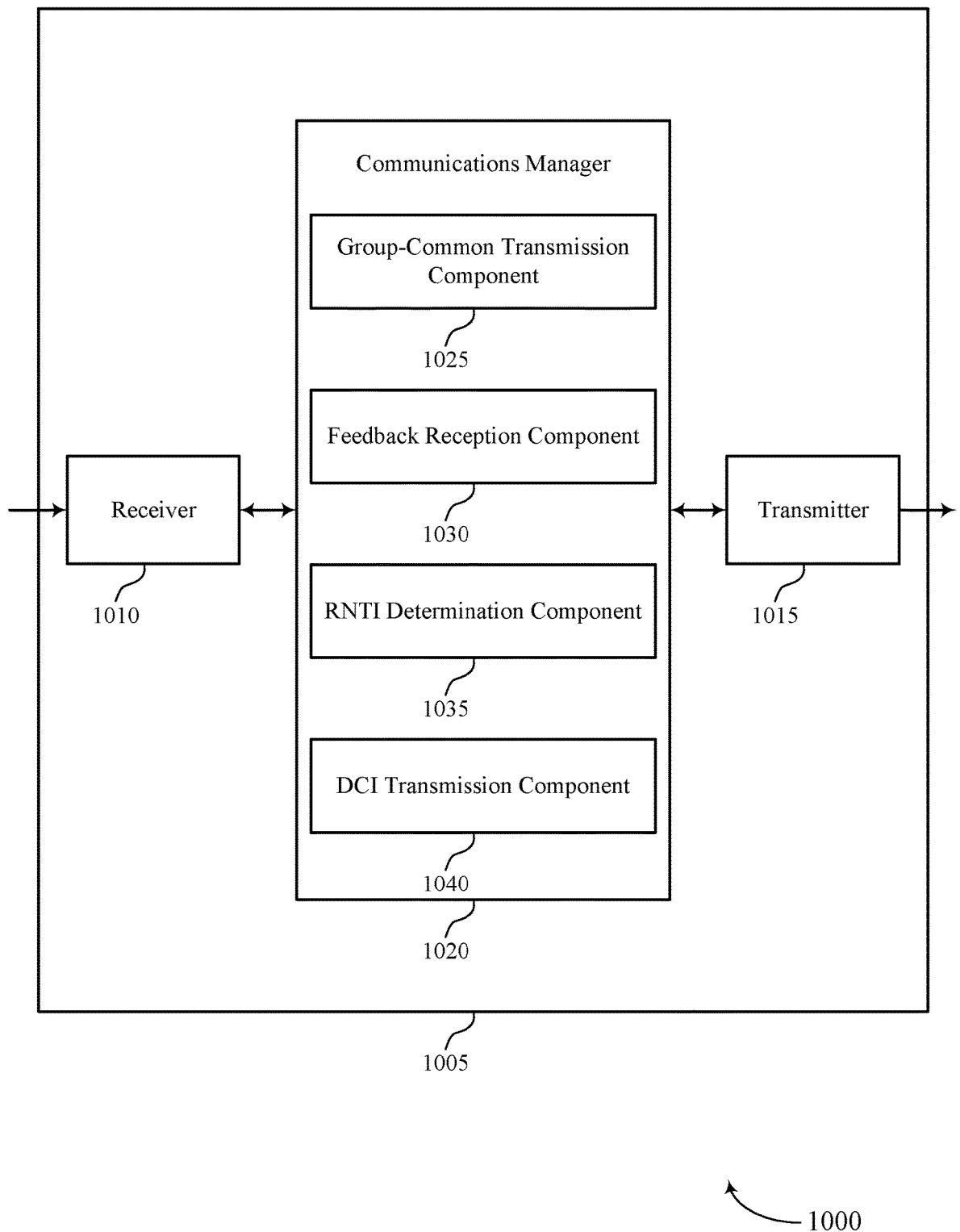

FIG. 10 shows a block diagram 1000 of a device 1005 that supports retransmission of semi-persistent scheduled group common downlink signaling in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to retransmission of semi-persistent scheduled group common downlink signaling). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to retransmission of semi-persistent scheduled group common downlink signaling). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of retransmission of semi-persistent scheduled group common downlink signaling as described herein. For example, the communications manager 1020 may include a group-common transmission component 1025, a feedback reception component 1030, an RNTI determination component 1035, a DCI transmission component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The group-common transmission component 1025 may be configured as or otherwise support a means for transmitting, in accordance with a first SPS configuration, a group-common transmission of a group-common downlink shared channel, the group-common transmission being associated with a first RNTI. The feedback reception component 1030 may be configured as or otherwise support a means for receiving feedback information for the group-common transmission. The RNTI determination component 1035 may be configured as or otherwise support a means for determining a RNTI to use for a retransmission of the group-common transmission. The DCI transmission component 1040 may be configured as or otherwise support a means for transmitting a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

Figure 11:
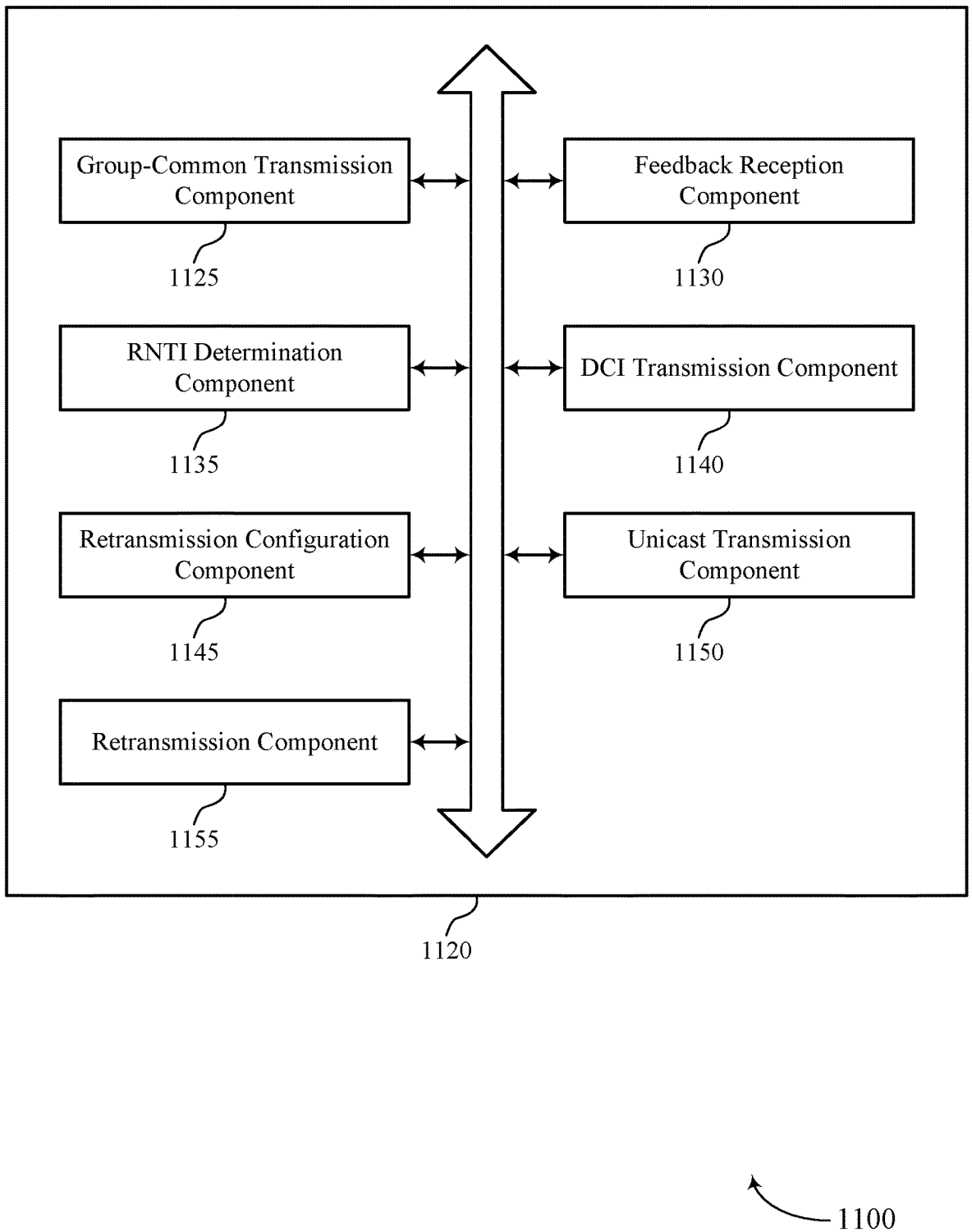
FIG. 11 shows a block diagram of a communications manager that supports retransmission of semi-persistent scheduled group common downlink signaling in accordance with aspects of the present disclosure.

FIG. 11 shows a block diagram 1100 of a communications manager 1120 that supports retransmission of semi-persistent scheduled group common downlink signaling in accordance with aspects of the present disclosure. The communications manager 1120 may be an example of aspects of a communications manager 920, a communications manager 1020, or both, as described herein. The communications manager 1120, or various components thereof, may be an example of means for performing various aspects of retransmission of semi-persistent scheduled group common downlink signaling as described herein. For example, the communications manager 1120 may include a group-common transmission component 1125, a feedback reception component 1130, an RNTI determination component 1135, a DCI transmission component 1140, a retransmission configuration component 1145, a unicast transmission component 1150, a retransmission component 1155, or any combination thereof. Each of these components may communicate, directly or indirectly, with one another (e.g., via one or more buses).

The communications manager 1120 may support wireless communications at a base station in accordance with examples as disclosed herein. The group-common transmission component 1125 may be configured as or otherwise support a means for transmitting, in accordance with a first SPS configuration, a group-common transmission of a group-common downlink shared channel, the group-common transmission being associated with a first RNTI. The feedback reception component 1130 may be configured as or otherwise support a means for receiving feedback information for the group-common transmission. The RNTI determination component 1135 may be configured as or otherwise support a means for determining a RNTI to use for a retransmission of the group-common transmission. The DCI transmission component 1140 may be configured as or otherwise support a means for transmitting a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

In some examples, the retransmission configuration component 1145 may be configured as or otherwise support a means for transmitting a SPS retransmission configuration indicating whether a group-common retransmission scheme or a unicast retransmission scheme is to be used, where the DCI message schedules either the group-common retransmission or the unicast retransmission in accordance with the SPS retransmission configuration.

In some examples, the unicast transmission component 1150 may be configured as or otherwise support a means for transmitting a different unicast transmission in accordance with a second SPS configuration different from the first SPS configuration, where the unicast transmission and the group-common transmission are scheduled in a same transmission time interval. In some examples, the DCI transmission component 1140 may be configured as or otherwise support a means for transmitting a second DCI message scheduling a retransmission of the different unicast transmission, where the retransmission of the different unicast transmission and the unicast retransmission of the group-common downlink shared channel correspond to a same feedback process identifier.

In some examples, the retransmission component 1155 may be configured as or otherwise support a means for determining a capability of the UE to receive the different unicast transmission and the group-common transmission in the same transmission time interval and corresponding to the same feedback process identifier.

In some examples, the retransmission component 1155 may be configured as or otherwise support a means for receiving an indication of the capability of the UE to receive the different unicast transmission and the group-common transmission in the same transmission time interval and corresponding to the same feedback process identifier.

In some examples, the retransmission component 1155 may be configured as or otherwise support a means for transmitting the retransmission of the different unicast transmission. In some examples, the retransmission component 1155 may be configured as or otherwise support a means for transmitting the unicast retransmission of the group-common downlink shared channel.

In some examples, the unicast retransmission of the group-common downlink shared channel and the retransmission of the different unicast transmission each have different feedback process identifiers.

In some examples, the retransmission component 1155 may be configured as or otherwise support a means for transmitting the retransmission of the different unicast transmission and the unicast retransmission in different transmission time intervals, where the unicast retransmission of the group-common downlink shared channel and the retransmission of the different unicast transmission share a same feedback process identifier.

In some examples, the DCI transmission component 1140 may be configured as or otherwise support a means for transmitting an indicator in the DCI message scheduling the unicast retransmission of the group-common downlink shared channel, the indicator differentiating between the unicast retransmission of the group-common downlink shared channel and the retransmission of the different unicast transmission.

In some examples, the unicast retransmission of the group-common downlink shared channel and the retransmission of the different unicast transmission are each associated with the same feedback process identifier but are each associated with different RNTIs.

In some examples, the unicast retransmission of the group-common downlink shared channel and the retransmission of the different unicast transmission correspond to the second RNTI.

In some examples, the first RNTI includes a group configured scheduling RNTI.

In some examples, the second RNTI includes a configured scheduling RNTI.

Figure 12:
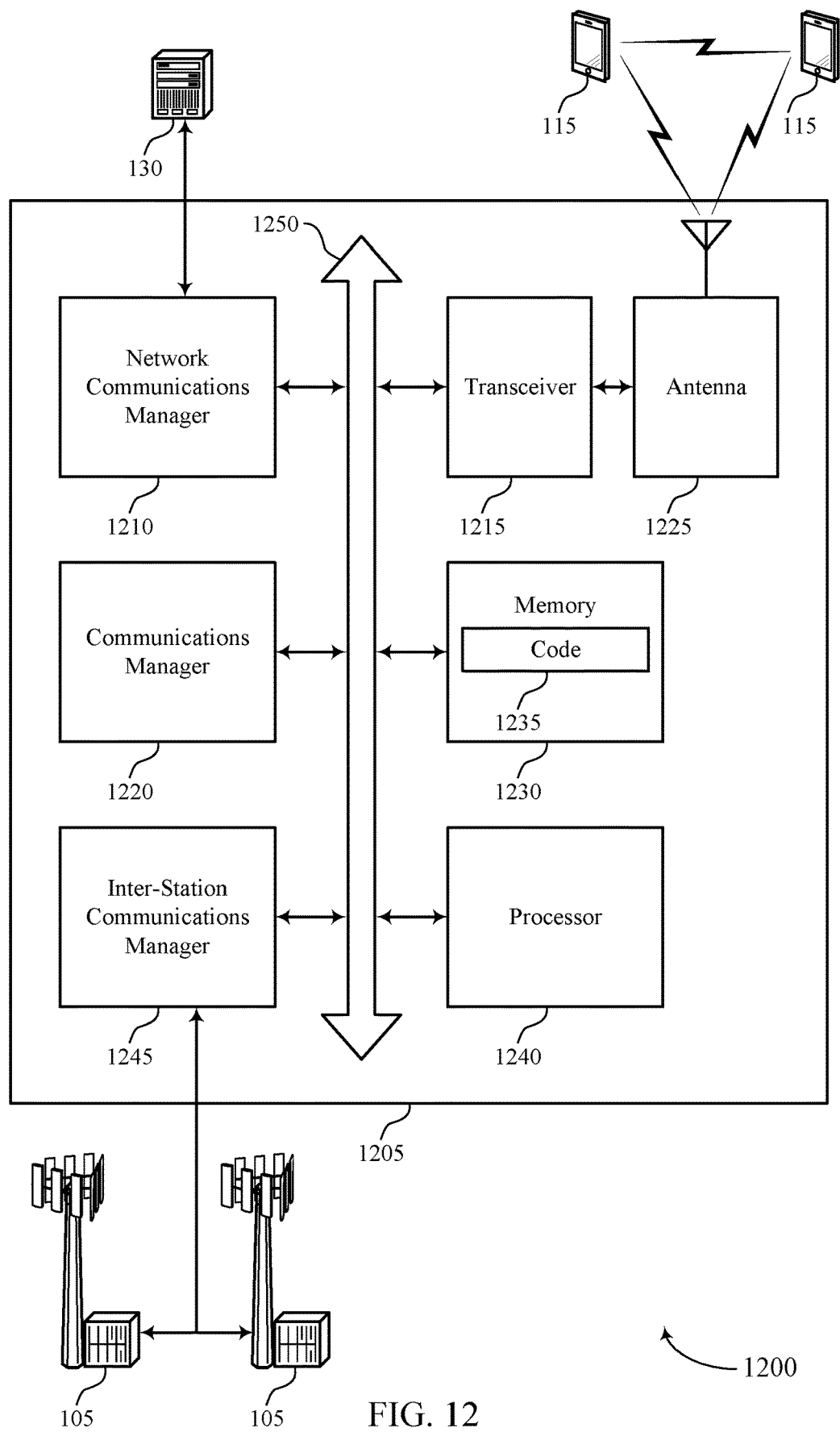
FIG. 12 shows a diagram of a system including a device that supports retransmission of semi-persistent scheduled group common downlink signaling in accordance with aspects of the present disclosure.

FIG. 12 shows a diagram of a system 1200 including a device 1205 that supports retransmission of semi-persistent scheduled group common downlink signaling in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting retransmission of semi-persistent scheduled group common downlink signaling). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, in accordance with a first SPS configuration, a group-common transmission of a group-common downlink shared channel, the group-common transmission being associated with a first RNTI. The communications manager 1220 may be configured as or otherwise support a means for receiving feedback information for the group-common transmission. The communications manager 1220 may be configured as or otherwise support a means for determining a RNTI to use for a retransmission of the group-common transmission. The communications manager 1220 may be configured as or otherwise support a means for transmitting a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

By including or configuring the communications manager 1220 in accordance with examples as described herein, the device 1205 may support techniques for improved coordination between device 1105 and other devices (e.g., device 405 or 705), as device 1105 may implement techniques to enable the other devices to distinguish colliding communications and decode the communications more efficiently.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of retransmission of semi-persistent scheduled group common downlink signaling as described herein, or the processor 1240 and the memory 1230 may be otherwise configured to perform or support such operations.

Figure 13:
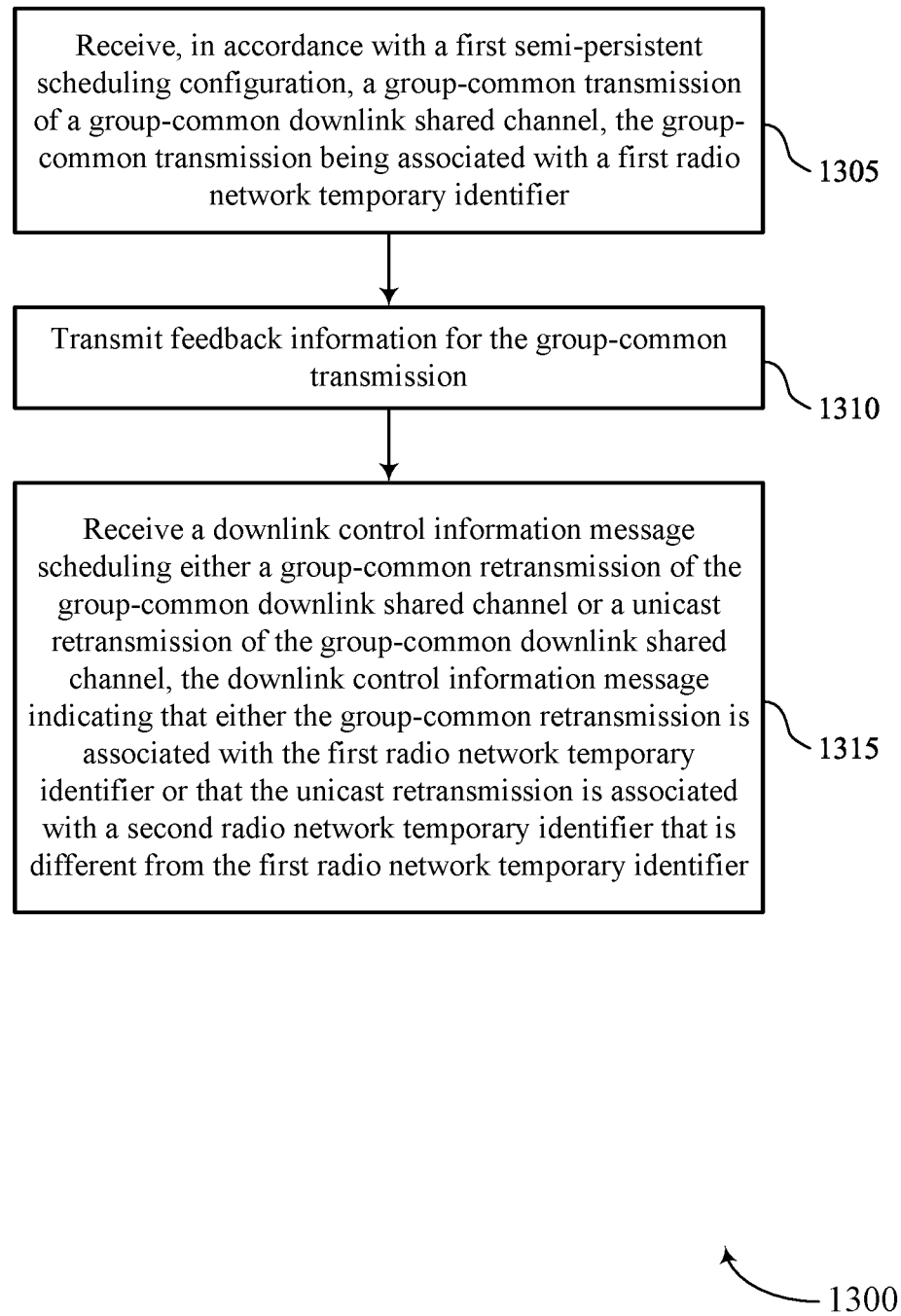
FIGS. 13 through 15 show flowcharts illustrating methods that support retransmission of semi-persistent scheduled group common downlink signaling in accordance with aspects of the present disclosure.

FIG. 13 shows a flowchart illustrating a method 1300 that supports retransmission of semi-persistent scheduled group common downlink signaling in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, in accordance with a first SPS configuration, a group-common transmission of a group-common downlink shared channel, the group-common transmission being associated with a first RNTI. The operations of 1305 may be performed in accordance with examples as disclosed herein. In some examples, aspects of the operations of 1305 may be performed by a group reception component 725 as described with reference to FIG. 7.

At 1310, the method may include transmitting feedback information for the group-common transmission. The operations of 1310 may be performed in accordance with examples as disclosed herein. In some examples, aspects of the operations of 1310 may be performed by a feedback transmission component 730 as described with reference to FIG. 7.

At 1315, the method may include receiving a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI. The operations of 1315 may be performed in accordance with examples as disclosed herein. In some examples, aspects of the operations of 1315 may be performed by a DCI reception component 735 as described with reference to FIG. 7.

Figure 14:
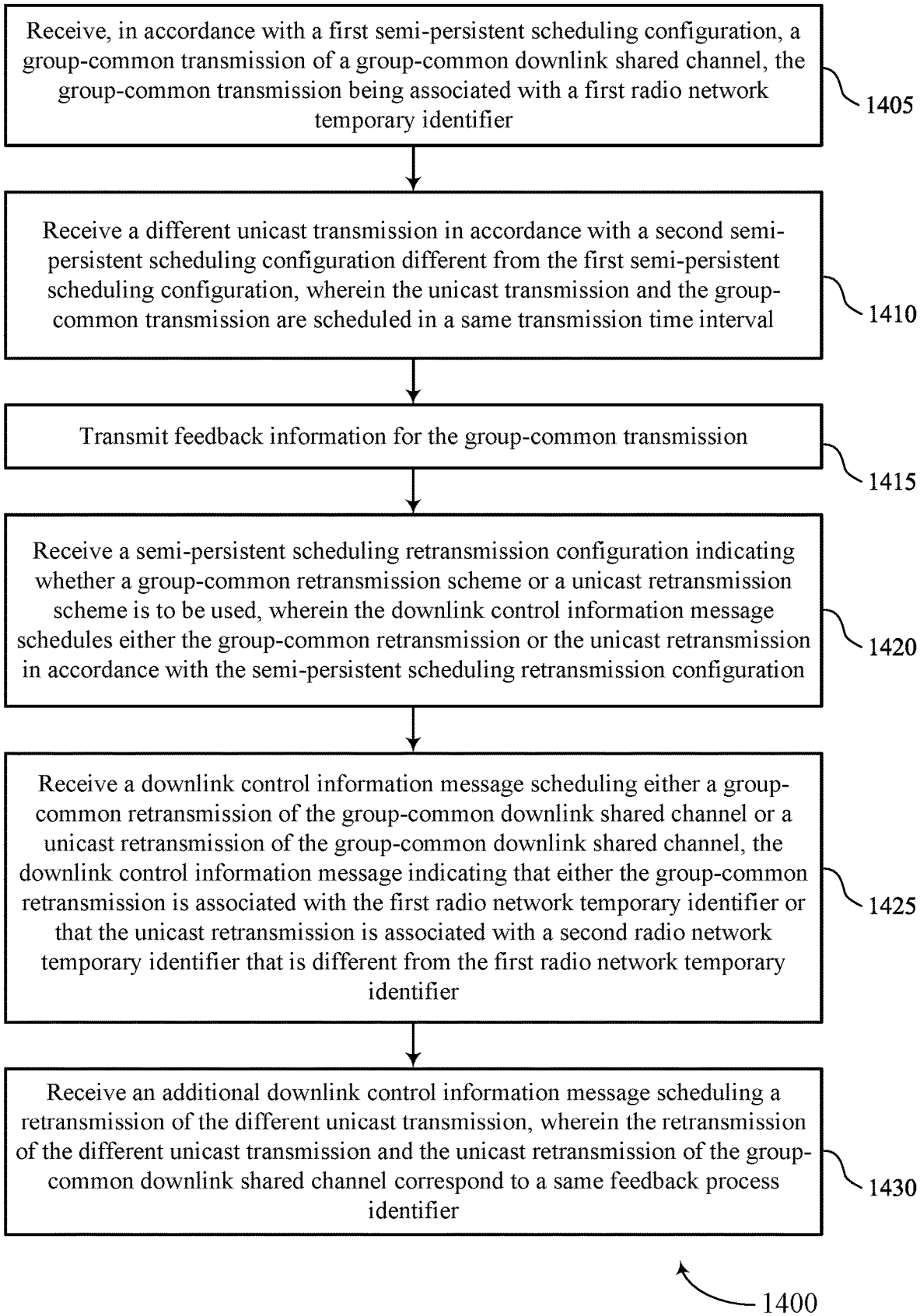

FIG. 14 shows a flowchart illustrating a method 1400 that supports retransmission of semi-persistent scheduled group common downlink signaling in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, in accordance with a first SPS configuration, a group-common transmission of a group-common downlink shared channel, the group-common transmission being associated with a first RNTI. The operations of 1405 may be performed in accordance with examples as disclosed herein. In some examples, aspects of the operations of 1405 may be performed by a group reception component 725 as described with reference to FIG. 7.

At 1410, the method may include receiving a different unicast transmission in accordance with a second SPS configuration different from the first SPS configuration, where the unicast transmission and the group-common transmission are scheduled in a same transmission time interval. The operations of 1410 may be performed in accordance with examples as disclosed herein. In some examples, aspects of the operations of 1410 may be performed by a unicast reception component 745 as described with reference to FIG. 7.

At 1415, the method may include transmitting feedback information for the group-common transmission. The operations of 1415 may be performed in accordance with examples as disclosed herein. In some examples, aspects of the operations of 1415 may be performed by a feedback transmission component 730 as described with reference to FIG. 7.

At 1420, the method may include receiving a SPS retransmission configuration indicating whether a group-common retransmission scheme or a unicast retransmission scheme is to be used, where the DCI message schedules either the group-common retransmission or the unicast retransmission in accordance with the SPS retransmission configuration. The operations of 1420 may be performed in accordance with examples as disclosed herein. In some examples, aspects of the operations of 1420 may be performed by a configuration component 740 as described with reference to FIG. 7.

At 1425, the method may include receiving a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI. The operations of 1425 may be performed in accordance with examples as disclosed herein. In some examples, aspects of the operations of 1425 may be performed by a DCI reception component 735 as described with reference to FIG. 7.

At 1430, the method may include receiving an additional DCI message scheduling a retransmission of the different unicast transmission, where the retransmission of the different unicast transmission and the unicast retransmission of the group-common downlink shared channel correspond to a same feedback process identifier. The operations of 1430 may be performed in accordance with examples as disclosed herein. In some examples, aspects of the operations of 1430 may be performed by a DCI reception component 735 as described with reference to FIG. 7.

Figure 15:
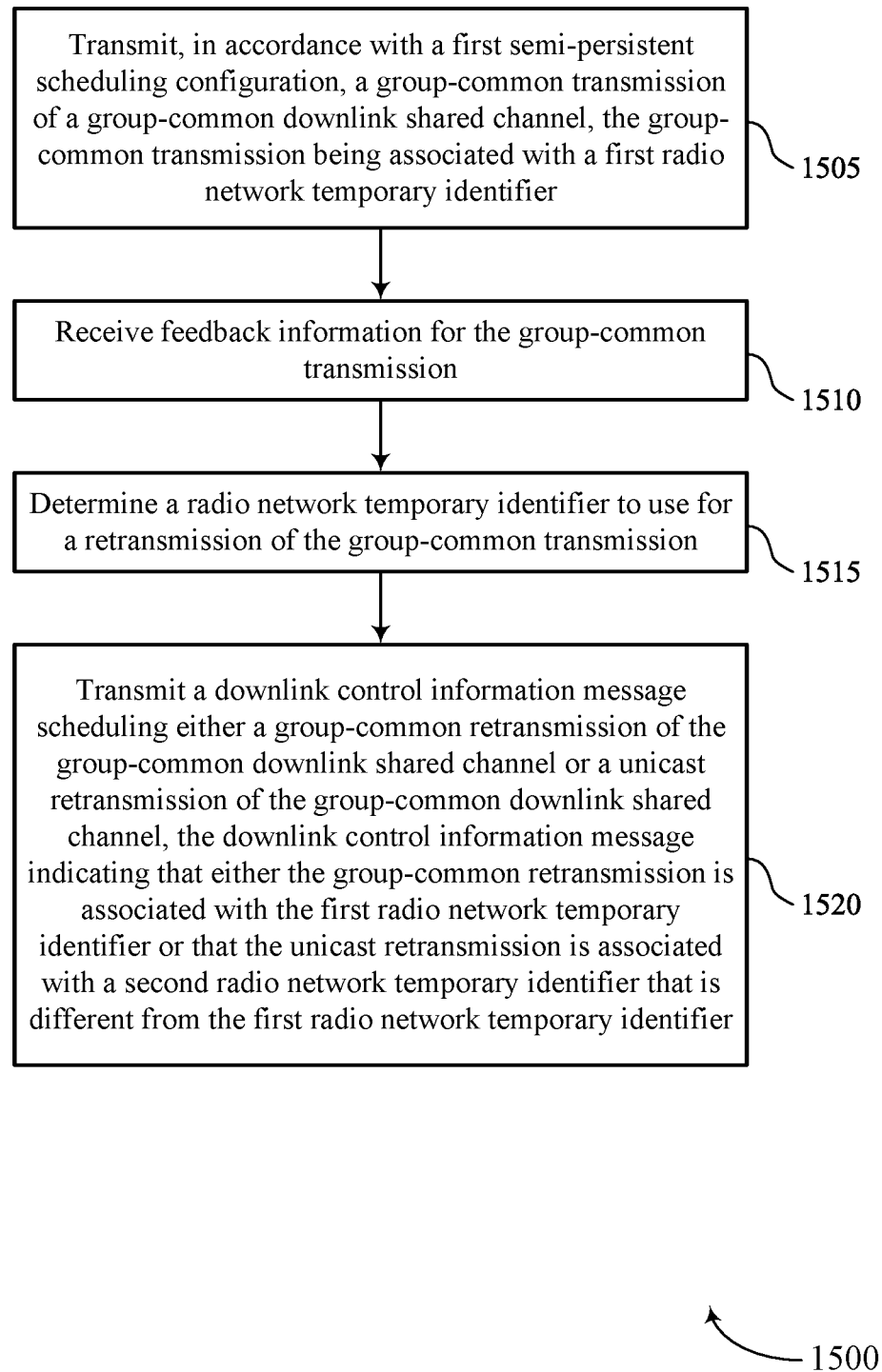

FIG. 15 shows a flowchart illustrating a method 1500 that supports retransmission of semi-persistent scheduled group common downlink signaling in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, in accordance with a first SPS configuration, a group-common transmission of a group-common downlink shared channel, the group-common transmission being associated with a first RNTI. The operations of 1505 may be performed in accordance with examples as disclosed herein. In some examples, aspects of the operations of 1505 may be performed by a group-common transmission component 1125 as described with reference to FIG. 11.

At 1510, the method may include receiving feedback information for the group-common transmission. The operations of 1510 may be performed in accordance with examples as disclosed herein. In some examples, aspects of the operations of 1510 may be performed by a feedback reception component 1130 as described with reference to FIG. 11.

At 1515, the method may include determining a RNTI to use for a retransmission of the group-common transmission. The operations of 1515 may be performed in accordance with examples as disclosed herein. In some examples, aspects of the operations of 1515 may be performed by an RNTI determination component 1135 as described with reference to FIG. 11.

At 1520, the method may include transmitting a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI. The operations of 1520 may be performed in accordance with examples as disclosed herein. In some examples, aspects of the operations of 1520 may be performed by a DCI transmission component 1140 as described with reference to FIG. 11.

The following provides an overview of aspects of the present disclosure:

Aspect 1: A method for wireless communications at a UE, comprising: receiving, in accordance with a first SPS configuration, a group-common transmission of a group-common downlink shared channel, the group-common transmission being associated with a first RNTI; transmitting feedback information for the group-common transmission; and receiving a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

Aspect 2: The method of aspect 1, further comprising: receiving a SPS retransmission configuration indicating whether a group-common retransmission scheme or a unicast retransmission scheme is to be used, wherein the DCI message schedules either the group-common retransmission or the unicast retransmission in accordance with the SPS retransmission configuration.

Aspect 3: The method of any of aspects 1 through 2, further comprising: receiving a different unicast transmission in accordance with a second SPS configuration different from the first SPS configuration, wherein the unicast transmission and the group-common transmission are scheduled in a same TTI; and receiving an additional DCI message scheduling a retransmission of the different unicast transmission, wherein the retransmission of the different unicast transmission and the unicast retransmission of the group-common downlink shared channel correspond to a same feedback process identifier.

Aspect 4: The method of aspect 3, further comprising: determining a first priority level of the group-common transmission and a second priority level of the different unicast transmission based at least in part on radio resource control signaling, DCI or a combination thereof; and receiving one of the unicast retransmission of the group-common downlink shared channel or the retransmission of the different unicast transmission based at least in part on relative values of the first priority level and the second priority level.

Aspect 5: The method of any of aspects 3 through 4, further comprising: determining a first SPS configuration identifier corresponding to the group-common transmission and a second SPS configuration identifier corresponding to the different unicast transmission; and receiving one of the unicast retransmission of the group-common downlink shared channel or the retransmission of the different unicast transmission based at least in part on relative values of the first SPS configuration identifier and the second SPS configuration identifier.

Aspect 6: The method of any of aspects 3 through 5, further comprising: receiving the unicast retransmission of the group-common downlink shared channel; and receiving the retransmission of the different unicast transmission.

Aspect 7: The method of aspect 6, wherein the unicast retransmission of the group-common downlink shared channel and the retransmission of the different unicast transmission each have different feedback process identifiers.

Aspect 8: The method of any of aspects 6 through 7, wherein the unicast retransmission of the group-common downlink shared channel and the retransmission of the different unicast transmission are each associated with the same feedback process identifier and are each also associated with a same RNTIs, the method further comprising: receiving an indicator in the additional DCI message scheduling the unicast retransmission of the group-common downlink shared channel, the indicator differentiating between the unicast retransmission of the group-common downlink shared channel and the retransmission of the different unicast transmission.

Aspect 9: The method of any of aspects 6 through 8, wherein the unicast retransmission of the group-common downlink shared channel and the retransmission of the different unicast transmission are each associated with the same feedback process identifier but are each associated with different RNTIs.

Aspect 10: The method of any of aspects 6 through 9, further comprising: receiving the retransmission of the different unicast transmission and the unicast retransmission in different TTIs, wherein the unicast retransmission of the group-common downlink shared channel and the retransmission of the different unicast transmission share a same feedback process identifier.

Aspect 11: The method of any of aspects 6 through 10, further comprising: transmitting an indication of a capability of the UE to receive the different unicast transmission and the group-common transmission in the same TTI and corresponding to the same feedback process identifier.

Aspect 12: The method of any of aspects 1 through 11, wherein the first RNTI comprises a group configured scheduling RNTI.

Aspect 13: The method of any of aspects 1 through 12, wherein the second RNTI comprises a configured scheduling RNTI.

Aspect 14: A method for wireless communications at a base station, comprising: transmitting, in accordance with a first SPS configuration, a group-common transmission of a group-common downlink shared channel, the group-common transmission being associated with a first RNTI; receiving feedback information for the group-common transmission; determining a RNTI to use for a retransmission of the group-common transmission; and transmitting a DCI message scheduling either a group-common retransmission of the group-common downlink shared channel or a unicast retransmission of the group-common downlink shared channel, the DCI message indicating that either the group-common retransmission is associated with the first RNTI or that the unicast retransmission is associated with a second RNTI that is different from the first RNTI.

Aspect 15: The method of aspect 14, further comprising: transmitting a SPS retransmission configuration indicating whether a group-common retransmission scheme or a unicast retransmission scheme is to be used, wherein the DCI message schedules either the group-common retransmission or the unicast retransmission in accordance with the SPS retransmission configuration.

Aspect 16: The method of any of aspects 14 through 15, further comprising: transmitting a different unicast transmission in accordance with a second SPS configuration different from the first SPS configuration, wherein the unicast transmission and the group-common transmission are scheduled in a same TTI; and transmitting a second DCI message scheduling a retransmission of the different unicast transmission, wherein the retransmission of the different unicast transmission and the unicast retransmission of the group-common downlink shared channel correspond to a same feedback process identifier.

Aspect 17: The method of aspect 16, further comprising: determining a capability of the UE to receive the different unicast transmission and the group-common transmission in the same TTI and corresponding to the same feedback process identifier.

Aspect 18: The method of aspect 17, further comprising: receiving an indication of the capability of the UE to receive the different unicast transmission and the group-common transmission in the same TTI and corresponding to the same feedback process identifier.

Aspect 19: The method of any of aspects 17 through 18, further comprising: transmitting the retransmission of the different unicast transmission; and transmitting the unicast retransmission of the group-common downlink shared channel.

Aspect 20: The method of any of aspects 17 through 19, wherein the unicast retransmission of the group-common downlink shared channel and the retransmission of the different unicast transmission each have different feedback process identifiers.

Aspect 21: The method of any of aspects 16 through 20, further comprising: transmitting the retransmission of the different unicast transmission and the unicast retransmission in different TTIs, wherein the unicast retransmission of the group-common downlink shared channel and the retransmission of the different unicast transmission share a same feedback process identifier.

Aspect 22: The method of aspect 21, further comprising: transmitting an indicator in the DCI message scheduling the unicast retransmission of the group-common downlink shared channel, the indicator differentiating between the unicast retransmission of the group-common downlink shared channel and the retransmission of the different unicast transmission.

Aspect 23: The method of any of aspects 21 through 22, wherein the unicast retransmission of the group-common downlink shared channel and the retransmission of the different unicast transmission are each associated with the same feedback process identifier but are each associated with different RNTIs.

Aspect 24: The method of any of aspects 21 through 23, wherein the unicast retransmission of the group-common downlink shared channel and the retransmission of the different unicast transmission correspond to the second RNTI.

Aspect 25: The method of any of aspects 14 through 24, wherein the first RNTI comprises a group configured scheduling RNTI.

Aspect 26: The method of any of aspects 14 through 25, wherein the second RNTI comprises a configured scheduling RNTI.

Aspect 27: An apparatus for wireless communications at a UE, comprising a processor; memory coupled with the processor; and instructions stored in the memory and executable by the processor to cause the apparatus to perform a method of any of aspects 1 through 13.

Aspect 28: An apparatus for wireless communications at a UE, comprising at least one means for performing a method of any of aspects 1 through 13.

Aspect 29: A non-transitory computer-readable medium storing code for wireless communications at a UE, the code comprising instructions executable by a processor to perform a method of any of aspects 1 through 13.

Aspect 30: An apparatus for wireless communications at a base station, comprising a processor; memory coupled with the processor; and instructions stored in the memory and executable by the processor to cause the apparatus to perform a method of any of aspects 14 through 26.

Aspect 31: An apparatus for wireless communications at a base station, comprising at least one means for performing a method of any of aspects 14 through 26.

Aspect 32: A non-transitory computer-readable medium storing code for wireless communications at a base station, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, in accordance with a first semi-persistent scheduling configuration, a group-common transmission of a group-common downlink shared channel, the group-common transmission being associated with a first radio network temporary identifier;
   transmitting feedback information for the group-common transmission;
   receiving a semi-persistent scheduling retransmission configuration indicating whether a group-common retransmission scheme or a unicast retransmission scheme is to be used; and
   receiving a downlink control information message scheduling either a group-common retransmission of the group-common downlink shared channel or a unicast retransmission of the group-common downlink shared channel, wherein the downlink control information message schedules either the group-common retransmission or the unicast retransmission in accordance with the semi-persistent scheduling retransmission configuration, the group-common retransmission and the unicast retransmission being associated with a second radio network temporary identifier that is either the same as, or different than, the first radio network temporary identifier.

2. The method of claim 1, further comprising:
   receiving a different unicast transmission in accordance with a second semi-persistent scheduling configuration different from the first semi-persistent scheduling configuration, wherein the unicast transmission and the group-common transmission are scheduled in a same transmission time interval; and
   receiving an additional downlink control information message scheduling a retransmission of the different unicast transmission, wherein the retransmission of the different unicast transmission and the unicast retransmission of the group-common downlink shared channel correspond to a same feedback process identifier.

3. The method of claim 2, further comprising:
   determining a first priority level of the group-common transmission and a second priority level of the different unicast transmission based at least in part on radio resource control signaling, downlink control information or a combination thereof; and
   receiving one of the unicast retransmission of the group-common downlink shared channel or the retransmission of the different unicast transmission based at least in part on relative values of the first priority level and the second priority level.

4. The method of claim 2, further comprising:
   determining a first semi-persistent scheduling configuration identifier corresponding to the group-common transmission and a second semi-persistent scheduling configuration identifier corresponding to the different unicast transmission; and
   receiving one of the unicast retransmission of the group-common downlink shared channel or the retransmission of the different unicast transmission based at least in part on relative values of the first semi-persistent scheduling configuration identifier and the second semi-persistent scheduling configuration identifier.

5. The method of claim 2, further comprising:
receiving the unicast retransmission of the group-common downlink shared channel; and
receiving the retransmission of the different unicast transmission.

6. The method of claim 5, wherein the unicast retransmission of the group-common downlink shared channel and the retransmission of the different unicast transmission each have different feedback process identifiers.

7. The method of claim 5, wherein the unicast retransmission of the group-common downlink shared channel and the retransmission of the different unicast transmission are each associated with the same feedback process identifier and are each also associated with a same radio network temporary identifiers, the method further comprising:
receiving an indicator in the additional downlink control information message scheduling the unicast retransmission of the group-common downlink shared channel, the indicator differentiating between the unicast retransmission of the group-common downlink shared channel and the retransmission of the different unicast transmission.

8. The method of claim 5, wherein the unicast retransmission of the group-common downlink shared channel and the retransmission of the different unicast transmission are each associated with the same feedback process identifier but are each associated with different radio network temporary identifiers.

9. The method of claim 5, further comprising:
receiving the retransmission of the different unicast transmission and the unicast retransmission in different transmission time intervals, wherein the unicast retransmission of the group-common downlink shared channel and the retransmission of the different unicast transmission share a same feedback process identifier.

10. The method of claim 5, further comprising:
transmitting an indication of a capability of the UE to receive the different unicast transmission and the group-common transmission in the same transmission time interval and corresponding to the same feedback process identifier.

11. The method of claim 1, wherein the first radio network temporary identifier comprises a group configured scheduling radio network temporary identifier.

12. The method of claim 1, wherein the second radio network temporary identifier comprises a configured scheduling radio network temporary identifier.

13. A method for wireless communications at a base station, comprising:
transmitting, in accordance with a first semi-persistent scheduling configuration, a group-common transmission of a group-common downlink shared channel, the group-common transmission being associated with a first radio network temporary identifier;
receiving feedback information for the group-common transmission;
determining a radio network temporary identifier to use for a retransmission of the group-common transmission;
transmitting a semi-persistent scheduling retransmission configuration indicating whether a group-common retransmission scheme or a unicast retransmission scheme is to be used; and
transmitting a downlink control information message scheduling either a group-common retransmission of the group-common downlink shared channel or a unicast retransmission of the group-common downlink shared channel, wherein the downlink control information message schedules either the group-common retransmission or the unicast retransmission in accordance with the semi-persistent scheduling retransmission configuration, the group-common retransmission and the unicast retransmission being associated with a second radio network temporary identifier that is either the same as, or different than, the first radio network temporary identifier.

14. The method of claim 13, further comprising:
transmitting a different unicast transmission in accordance with a second semi-persistent scheduling configuration different from the first semi-persistent scheduling configuration, wherein the unicast transmission and the group-common transmission are scheduled in a same transmission time interval; and
transmitting a second downlink control information message scheduling a retransmission of the different unicast transmission, wherein the retransmission of the different unicast transmission and the unicast retransmission of the group-common downlink shared channel correspond to a same feedback process identifier.

15. The method of claim 14, further comprising:
determining a capability of a user equipment (UE) to receive the different unicast transmission and the group-common transmission in the same transmission time interval and corresponding to the same feedback process identifier.

16. The method of claim 15, further comprising:
receiving an indication of the capability of the UE to receive the different unicast transmission and the group-common transmission in the same transmission time interval and corresponding to the same feedback process identifier.

17. The method of claim 15, further comprising:
transmitting the retransmission of the different unicast transmission; and
transmitting the unicast retransmission of the group-common downlink shared channel.

18. The method of claim 15, wherein the unicast retransmission of the group-common downlink shared channel and the retransmission of the different unicast transmission each have different feedback process identifiers.

19. The method of claim 14, further comprising:
transmitting the retransmission of the different unicast transmission and the unicast retransmission in different transmission time intervals, wherein the unicast retransmission of the group-common downlink shared channel and the retransmission of the different unicast transmission share a same feedback process identifier.

20. The method of claim 19, further comprising:
transmitting an indicator in the downlink control information message scheduling the unicast retransmission of the group-common downlink shared channel, the indicator differentiating between the unicast retransmission of the group-common downlink channel and the retransmission of the different unicast transmission.

21. The method of claim 19, wherein the unicast retransmission of the group-common downlink shared channel and the retransmission of the different unicast transmission are each associated with the same feedback process identifier but are each associated with different radio network temporary identifiers.

22. The method of claim 19, wherein the unicast retransmission of the group-common downlink shared channel and the retransmission of the different unicast transmission correspond to the second radio network temporary identifier.

23. The method of claim 13, wherein the first radio network temporary identifier comprises a group configured scheduling radio network temporary identifier.

24. The method of claim 13, wherein the second radio network temporary identifier comprises a configured scheduling radio network temporary identifier.

25. An apparatus for wireless communications at a user equipment (UE), comprising:
a processor;
memory coupled with the processor; and
instructions stored in the memory and executable by the processor to cause the apparatus to:
receive, in accordance with a first semi-persistent scheduling configuration, a group-common transmission of a group-common downlink shared channel, the group-common transmission being associated with a first radio network temporary identifier;
transmit feedback information for the group-common transmission;
receive a semi-persistent scheduling retransmission configuration indicating whether a group-common retransmission scheme or a unicast retransmission scheme is to be used; and
receive a downlink control information message scheduling either a group-common retransmission of the group-common downlink shared channel or a unicast retransmission of the group-common downlink shared channel, wherein the downlink control information message schedules either the group-common retransmission or the unicast retransmission in accordance with the semi-persistent scheduling retransmission configuration, the group-common retransmission and the unicast retransmission being associated with a second radio network temporary identifier that is either the same as, or different than, the first radio network temporary identifier.

26. The apparatus of claim 25, wherein the instructions are further executable by the processor to cause the apparatus to:
receive a different unicast transmission in accordance with a second semi-persistent scheduling configuration different from the first semi-persistent scheduling configuration, wherein the unicast transmission and the group-common transmission are scheduled in a same transmission time interval; and
receive an additional downlink control information message scheduling a retransmission of the different unicast transmission, wherein the retransmission of the different unicast transmission and the unicast retransmission of the group-common downlink shared channel correspond to a same feedback process identifier.

27. The apparatus of claim 26, wherein the instructions are further executable by the processor to cause the apparatus to:
determine a first priority level of the group-common transmission and a second priority level of the different unicast transmission based at least in part on radio resource control signaling, downlink control information or a combination thereof; and
receive one of the unicast retransmission of the group-common downlink shared channel or the retransmission of the different unicast transmission based at least in part on relative values of the first priority level and the second priority level.

28. The apparatus of claim 26, wherein the instructions are further executable by the processor to cause the apparatus to:
determine a first semi-persistent scheduling configuration identifier corresponding to the group-common transmission and a second semi-persistent scheduling configuration identifier corresponding to the different unicast transmission; and
receive one of the unicast retransmission of the group-common downlink shared channel or the retransmission of the different unicast transmission based at least in part on relative values of the first semi-persistent scheduling configuration identifier and the second semi-persistent scheduling configuration identifier.

29. The apparatus of claim 26, wherein the instructions are further executable by the processor to cause the apparatus to:
receive the unicast retransmission of the group-common downlink shared channel; and
receive the retransmission of the different unicast transmission.

30. The apparatus of claim 29, wherein the unicast retransmission of the group-common downlink shared channel and the retransmission of the different unicast transmission each have different feedback process identifiers.

31. The apparatus of claim 29, wherein the unicast retransmission of the group-common downlink shared channel and the retransmission of the different unicast transmission are each associated with the same feedback process identifier and are each also associated with a same radio network temporary identifiers, and the instructions are further executable by the processor to cause the apparatus to:
receive an indicator in the additional downlink control information message scheduling the unicast retransmission of the group-common downlink shared channel, the indicator differentiating between the unicast retransmission of the group-common downlink shared channel and the retransmission of the different unicast transmission.

32. The apparatus of claim 29, wherein the unicast retransmission of the group-common downlink shared channel and the retransmission of the different unicast transmission are each associated with the same feedback process identifier but are each associated with different radio network temporary identifiers.

33. The apparatus of claim 29, wherein the instructions are further executable by the processor to cause the apparatus to:
receive the retransmission of the different unicast transmission and the unicast retransmission in different transmission time intervals, wherein the unicast retransmission of the group-common downlink shared channel and the retransmission of the different unicast transmission share a same feedback process identifier.

34. The apparatus of claim 29, wherein the instructions are further executable by the processor to cause the apparatus to:
transmit an indication of a capability of the UE to receive the different unicast transmission and the group-common transmission in the same transmission time interval and corresponding to the same feedback process identifier.

35. The apparatus of claim 25, wherein the first radio network temporary identifier comprises a group configured scheduling radio network temporary identifier.

36. The apparatus of claim 25, wherein the second radio network temporary identifier comprises a configured scheduling radio network temporary identifier.

37. An apparatus for wireless communications at a base station, comprising:
a processor;
memory coupled with the processor; and
instructions stored in the memory and executable by the processor to cause the apparatus to:
transmit, in accordance with a first semi-persistent scheduling configuration, a group-common transmission of a group-common downlink shared channel, the group-common transmission being associated with a first radio network temporary identifier;
receive feedback information for the group-common transmission;
determine a radio network temporary identifier to use for a retransmission of the group-common transmission;
transmit a semi-persistent scheduling retransmission configuration indicating whether a group-common retransmission scheme or a unicast retransmission scheme is to be used; and
transmit a downlink control information message scheduling either a group-common retransmission of the group-common downlink shared channel or a unicast retransmission of the group-common downlink shared channel, wherein the downlink control information message schedules either the group-common retransmission or the unicast retransmission in accordance with the semi-persistent scheduling retransmission configuration, the group-common retransmission and the unicast retransmission being associated with a second radio network temporary identifier that is either the same as, or different than, the first radio network temporary identifier.

38. The apparatus of claim 37, wherein the instructions are further executable by the processor to cause the apparatus to:
transmit a different unicast transmission in accordance with a second semi-persistent scheduling configuration different from the first semi-persistent scheduling configuration, wherein the unicast transmission and the group-common transmission are scheduled in a same transmission time interval; and
transmit a second downlink control information message scheduling a retransmission of the different unicast transmission, wherein the retransmission of the different unicast transmission and the unicast retransmission of the group-common downlink shared channel correspond to a same feedback process identifier.

39. The apparatus of claim 38, wherein the instructions are further executable by the processor to cause the apparatus to:
determine a capability of a user equipment (UE) to receive the different unicast transmission and the group-common transmission in the same transmission time interval and corresponding to the same feedback process identifier.

40. The apparatus of claim 39, wherein the instructions are further executable by the processor to cause the apparatus to:
receive an indication of the capability of the UE to receive the different unicast transmission and the group-common transmission in the same transmission time interval and corresponding to the same feedback process identifier.

41. The apparatus of claim 39, wherein the instructions are further executable by the processor to cause the apparatus to:
transmit the retransmission of the different unicast transmission; and
transmit the unicast retransmission of the group-common downlink shared channel.

42. The apparatus of claim 39, wherein the unicast retransmission of the group-common downlink shared channel and the retransmission of the different unicast transmission each have different feedback process identifiers.

43. The apparatus of claim 38, wherein the instructions are further executable by the processor to cause the apparatus to:
transmit the retransmission of the different unicast transmission and the unicast retransmission in different transmission time intervals, wherein the unicast retransmission of the group-common downlink shared channel and the retransmission of the different unicast transmission share a same feedback process identifier.

44. The apparatus of claim 43, wherein the instructions are further executable by the processor to cause the apparatus to:
transmit an indicator in the downlink control information message scheduling the unicast retransmission of the group-common downlink shared channel, the indicator differentiating between the unicast retransmission of the group-common downlink shared channel and the retransmission of the different unicast transmission.

45. The apparatus of claim 43, wherein the unicast retransmission of the group-common downlink shared channel and the retransmission of the different unicast transmission are each associated with the same feedback process identifier but are each associated with different radio network temporary identifiers.

46. The apparatus of claim 43, wherein the unicast retransmission of the group-common downlink shared channel and the retransmission of the different unicast transmission correspond to the second radio network temporary identifier.

47. The apparatus of claim 37, wherein the first radio network temporary identifier comprises a group configured scheduling radio network temporary identifier.

48. The apparatus of claim 37, wherein the second radio network temporary identifier comprises a configured scheduling radio network temporary identifier.

* * * * *